US012135952B2

(12) United States Patent
Buchmann

(10) Patent No.: US 12,135,952 B2
(45) Date of Patent: Nov. 5, 2024

(54) LOGICAL POINTERS SUPPORTING REUSE OF TEXT TRANSLATIONS

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 17/724,364

(22) Filed: Apr. 19, 2022

(65) Prior Publication Data

US 2023/0334268 A1 Oct. 19, 2023

(51) Int. Cl.
*G06F 40/58* (2020.01)
*G06F 40/47* (2020.01)

(52) U.S. Cl.
CPC .............. *G06F 40/58* (2020.01); *G06F 40/47* (2020.01)

(58) Field of Classification Search
CPC .................................. G06F 40/58; G06F 40/47
See application file for complete search history.

(56) References Cited

U.S. PATENT DOCUMENTS

| 6,345,243 B1* | 2/2002 | Clark | G06F 40/47 |
| | | | 704/7 |
| 9,916,305 B1* | 3/2018 | Ayan | G06F 40/58 |
| 2006/0136223 A1* | 6/2006 | Brun | G06F 40/58 |
| | | | 704/277 |
| 2006/0206304 A1* | 9/2006 | Liu | G06F 40/47 |
| | | | 704/2 |
| 2009/0106018 A1* | 4/2009 | Liu | G06F 40/58 |
| | | | 704/4 |
| 2014/0244236 A1* | 8/2014 | Johnson, III | G06F 9/454 |
| | | | 704/2 |
| 2015/0120274 A1* | 4/2015 | Forbush | G06F 40/58 |
| | | | 704/2 |
| 2017/0322944 A1* | 11/2017 | Farr | H04L 67/02 |
| 2021/0165855 A1* | 6/2021 | Stuehler | G06F 16/90344 |
| 2023/0334268 A1* | 10/2023 | Buchmann | G06F 40/47 |

FOREIGN PATENT DOCUMENTS

WO  WO 2008/085821  7/2008

OTHER PUBLICATIONS

Extended European Search Report, received in European Application No. 23164866.8, Sep. 5, 2023, 7 pages.

\* cited by examiner

*Primary Examiner* — Douglas Godbold
(74) *Attorney, Agent, or Firm* — Klarquist Sparkman, LLP

(57) ABSTRACT

Techniques and solutions are described for facilitating the reuse of text translations. For a first instance of text in a human language, a first logical pointer value is assigned to the first instance of the text, pointing to a target having at least a first translation for the text. A second instance of the text is received. If only the first instance is present, the first logical pointer value is assigned to the second instance. If a third instance of the text is present, associated with a second translation and a second logical pointer value, user or process input is received determining whether the first logical pointer value or the second logical pointer value is assigned to the second instance. Context information can be provided to a user to help determine whether the second instance should be associated with the first translation or the second translation.

20 Claims, 26 Drawing Sheets

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from   vbak
    left outer to one join vbkd on vbak.vbeln = vbkd.vbeln
                              and vbkd.posnr = '000000' association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]   //Composition
  _Item,
  vbak.vkorg                                            as SalesOrganization,
  vbak.auart                                            as SalesOrderType,
  vbak.vtweg                                            as DistributionChannel,
  @ObjectModel.foreignKey.association: '_SoldToParty'
  vbak.kunnr
  _SoldToParty,
  @DefaultAggregation: #SUM
  @Semantics.amount.currencyCode: 'TransactionCurrency'
  vbak.netwr                                            as TotalNetAmount,
  @Semantics.currencyCode: true
  @ObjectModel.foreignKey.association: '_TransactionCurrency'
  vbak.waerk                                            as TransactionCurrency,
  _TransactionCurrency,
  ...
}
where vbak.vbtyp = 'C';
```

FIG. 10

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'  1104
@Analytics.dataCategory: #DIMENSION
@AccessControl.authorizationCheck: #CHECK
@Metadata.allowExtensions: true
@Search.searchable: true
define view I_SampleSalesOrder
  as select from     vbak
    left outer to one join vbkd on   vbak.vbeln = vbkd.vbeln
                             and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer      as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]    //Composition
  _Item,
  vbak.vkorg                                  as SalesOrganization,
  vbak.auart                                  as SalesOrderType,
  vbak.vtweg                                  as DistributionChannel,
  @ObjectModel.foreignKey.association: '_SoldToParty'
  vbak.kunnr                                  as SoldToParty,
  _SoldToParty,
  @DefaultAggregation: #SUM
  @Semantics.amount.currencyCode: 'TransactionCurrency'
  vbak.netwr                                  as TotalNetAmount,
  @Semantics.currencyCode: true
  @ObjectModel.foreignKey.association: '_TransactionCurrency'
  vbak.waerk                                  as TransactionCurrency,
  _TransactionCurrency,
  ...
}
where vbak.vbtyp = 'C';
```

```
                                                    1108
@EndUserText.label: 'Auto assigned role for I_SampleSalesOrder'
@MappingRole: true
define role I_SampleSalesOrder {
    grant select on I_SampleSalesOrder
    where ( SalesOrderType ) =
    aspect pfcg_auth ( v_vbak_aat,
                       auart,
                       actvt = '03' );
}
```

1112

```
@Metadata.layer: #CORE
annotate view I_SampleSalesOrder
with
{
    @UI.lineItem: [{importance: #HIGH }]
    SalesOrder;
    @UI.lineItem: [{importance: #HIGH }]
    SalesOrderType;
}
```

1116

```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
    _SoldToParty.CustomerClassification
}
```

FIG. 11

System Software Versions 1376

| SystemID 1378 | SystemSoftwareVersionID | SystemSoftwareVersionStartDateTime | ... 1390 |
|---|---|---|---|
| SAP:SYSTEM1 | 1 | 20190101080703 | ... |
| SAP:SYSTEM2 | 2 | 20190102080703 | ... |

1354 ⤴ 1380

Software Component Versions 1384

| Software Component VersionID 1382 | SoftwareComponent ID | Software Component ReleaseID 1386 | Software Component SupportPackageID 1388 | ... 1390 |
|---|---|---|---|---|
| 11 | S4CORE | 102 | 2 | ... |
| 12 | SAP_BASIS | 752 | 2 | ... |
| 24 | S4CORE | 102 | 3 | ... |
| 25 | SAP_BASIS | 752 | 3 | ... |

1356 ⤴

Software Versions 1372

| System Software VersionID 1374 | Software Component VersionID | ... 1390 |
|---|---|---|
| 1 | 11 | ... |
| 2 | 12 | ... |
| 2 | 24 | ... |
| 2 | 25 | ... |

1352 ⤴ 1350

Assignments of Object Versions to Software Components 1362

| Software Component VersionID 1360 | ObjectType | ObjectName | ObjectVersion ID 1364 | Previous Object VersionID 1366 | ObjectDeletionDateTime 1368 | ... 1370 |
|---|---|---|---|---|---|---|
| 11 | DDLS | DDLS1 | 123 | | | |
| 11 | DDLS | DDLS2 | 788 | | | |
| 24 | DDLS | DDLS1 | 123 | | | |
| 24 | DDLS | DDLS1 | 788 | 788 | | |
| 24 | DDLS | DDLS2 | 789 | | 20190413080703 | |

Select Statements 1504

| Object Type | Object Name | Object VersionID | EntityName | PrimaryData SourceName | PrimaryData SourceType | WhereCondition CollectionID | JoinCondition CollectionID | ... |
|---|---|---|---|---|---|---|---|---|
| DDLS | DDLS1 | 56 | VIEW1 | TABLE1 | TABLE | | | ... |
| DDLS | DDLS2 | 77 | VIEW2 | TABLE2 | TABLE | | | ... |
| DDLS | DDLS3 | 88 | VIEW3 | TABLE3 | TABLE | | 1 | ... |
| DDLS | DDLS4 | 255 | VIEW4 | VIEW1 | VIEW | 1 | | ... |

Association Definition 1584

| Object Type | Object Name | Object VersionID | Entity Name | Association Name | Association OriginalName | Target Entity Name | Target Entity Type | Target Minimum Cardinality | Target Maximum Cardinality | OnCondition CollectionID | ... |
|---|---|---|---|---|---|---|---|---|---|---|---|
| DDLS | DDLS2 | 77 | VIEW2 | _V2 | _V2 | VIEW3 | VIEW | 0 | 1 | 1 | ... |

Conditions

| Object Type | Object Name | Object VersionID | Condition Collection ID | Group ID | Grouping Ordinal Number | Grouping Operator | Left Group ID | Left Data Source Name | Left Field Name | Left Value | LeftToRight Relation | Right Group ID | Right Data Source Name | Right Field Name | Right Value | ... |
|---|---|---|---|---|---|---|---|---|---|---|---|---|---|---|---|---|
| DDLS | DDLS4 | 255 | 1 | 1 | | | | VIEW1 | | | LEFT_OUTER_JOIN | 2 | | | | |
| DDLS | DDLS4 | 255 | 1 | 2 | 1 | | | VIEW2 | FIELD2 | | EQUAL | | VIEW1 | FIELD2 | REL | |
| DDLS | DDLS4 | 255 | 1 | 2 | 2 | AND | | TABLE3 | FIELD3 | | NOT_EQUAL | | | | x | |
| DDLS | DDLS3 | 88 | 1 | | 1 | | | VIEW2 | FIELD3 | | EQUAL | | VIEW3 | VIEW3 | | |
| DDLS | DDLS2 | 77 | | | | | | | | | | | | | | |

FIG. 15

DDLS2

```
define view View2                                        1604
  as select from View1
{                                     1620
  key View1.Field1 as AliasedField1,
  case View1.Field2
    when 'VAL1' then 'X'
    when 'VAL2' then 'Y'
    else 'Z'           1622
  end as CalculatedField2,                                  1624
  concat( View1.Field1, View1.Field2) as CalculatedField3,
  cast( View1.Field3 as DE4 preserving type ) as CalculatedField4
}                                                                 1626
```

DDLS1

```
                        1608
  define view View1
    as select from Table1
  {                    1630
    key Table1.Field1,
        Table1.Field2,
        Table1.Field3   1632
  }        1634
```

TABLE1

```
                          1612
  define table Table1
  {         1640
    key Field1 : DE1 not null;
      Field2 : DE2;
  1642  Field3 : DE3;
  }        1644
```

FIG. 16

| Object Type | Object Name | Object Version ID | Entity Name | Field Name | Field Original Name | Base Entity Name | Base Entity Type | Base Field Name | Base Expression ID | IsKey Field | Data Element | Data Type | Data Type Length |
|---|---|---|---|---|---|---|---|---|---|---|---|---|---|
| DDLS | DDLS1 | 13 | VIEW1 | FIELD1 | Field1 | TABLE1 | TABL | FIELD1 | | TRUE | DE1 | CHAR | 30 |
| DDLS | DDLS1 | 13 | VIEW1 | FIELD2 | Field2 | TABLE1 | TABL | FIELD2 | | | DE2 | CHAR | 10 |
| DDLS | DDLS1 | 13 | VIEW1 | FIELD3 | Field3 | TABLE1 | TABL | FIELD3 | | | DE3 | CHAR | 20 |
| DDLS | DDLS2 | 65 | VIEW2 | ALIASEDFIELD1 | AliasedField1 | VIEW1 | VIEW | FIELD1 | | TRUE | DE1 | CHAR | 30 |
| DDLS | DDLS2 | 65 | VIEW2 | CALCULATEDFIELD2 | CalculatedField2 | | | | 1 | | | CHAR | 4 |
| DDLS | DDLS2 | 65 | VIEW2 | CALCULATEDFIELD3 | CalculatedField3 | | | | 2 | | | CHAR | 40 |
| DDLS | DDLS2 | 65 | VIEW2 | CALCULATEDFIELD4 | CalculatedField4 | VIEW1 | VIEW | FIELD3 | | | DE4 | CHAR | 20 |
| TABL | TABLE1 | 24 | TABLE1 | FIELD1 | | | | | | TRUE | DE1 | CHAR | 30 |
| TABL | TABLE1 | 24 | TABLE1 | FIELD2 | | | | | | | DE2 | CHAR | 10 |
| TABL | TABLE1 | 24 | TABLE1 | FIELD3 | | | | | | | DE3 | CHAR | 20 |

| Data Type Decimals | Field Definition StartLine | Field Definition StartColumn | Field Definition EndLine | Field Definition EndColumn |
|---|---|---|---|---|
| ... | ... | ... | ... | ... |
| | 4 | 2 | 4 | 35 |
| | 5 | 2 | 9 | 25 |
| | 10 | 2 | 10 | 57 |
| | 11 | 2 | 11 | 65 |
| ... | ... | ... | ... | ... |

FIG. 17

2212 ObjectVersionSource  2214          2216

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

2204 ↖ (points to table above)

2208 ↘

DdlsVersion  2220      2222       2224       2226

| DdlsName | DdlsVersionID | CdsEntityName | CdsEntityOriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 22

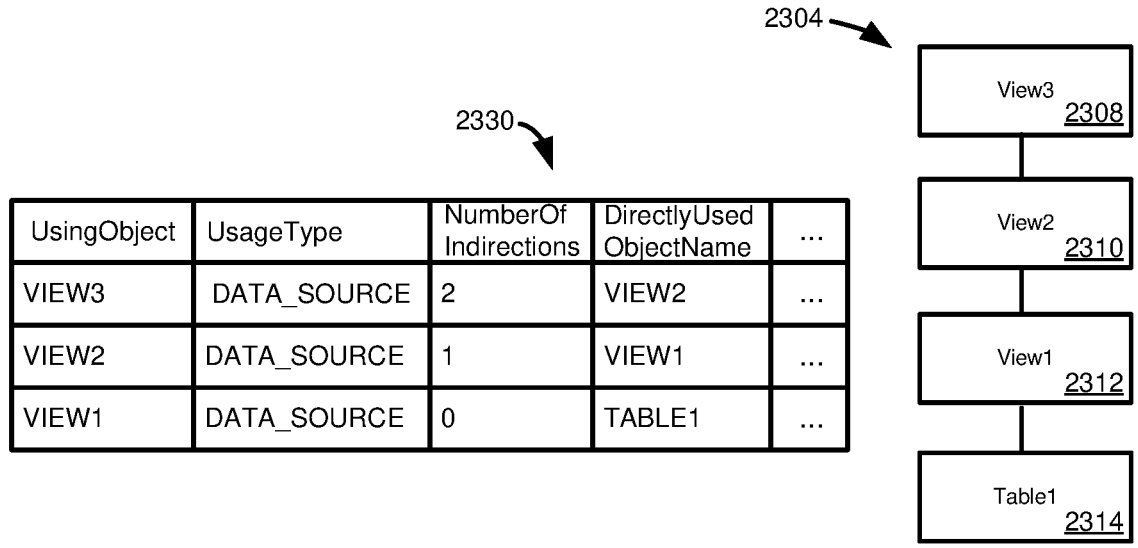

FIG. 23

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 24

LOGICAL POINTERS SUPPORTING REUSE OF TEXT TRANSLATIONS

FIELD

The present disclosure generally relates to text translation. Particular embodiments provide technologies that allow translations defined for one instance of particular text to be used with other instances of the particular text.

BACKGROUND

Software typically has a number of user-facing elements, whether that might be code having human-language elements, such as string values, or elements that are provided to various types of software users, including end users (where the information provided to end users can include string values specified in code). Typically, software is at least primarily written in a source human language (as opposed to the programming language used, where the source human language can refer to text provided to end users, but could also indicate things such as variable names or information in comments, as opposed to elements of the programming language, such as "IF" statements), which may be a language used by the primary target audience for the software or to facilitate software development. Situations can exist where, for example, software elements of primary use to a developer (such as variable names) in are in one language and elements primarily directed to software users (such as user interface elements) are in a different language.

However, it may be desirable to have at least some software elements available in a language used instead of, or in addition to, a source (or base or standard) language. For instance, for a user interface, it may be desirable to have elements presented on a user interface in a language (human language, as opposed to a computing language) that is different than a source or base language. If a software application is to be used in Japan, and an insufficient number of Japanese users might be expected to be proficient enough in English (serving a source or base language), it may be desirable to have at least some language elements presented to a user in Japanese, or to allow a user to select, or otherwise, view Japanese or English text.

However, manual translation of text, even using computer-implemented tools such as machine-translation, can be highly resource intensive, both in terms of computing and human resources. Prior attempts to address these issues have been unsatisfactory in at least some aspects. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the reuse of text translations. For a first instance of text in a human language, a first logical pointer value is assigned to the first instance of the text, pointing to a target having at least a first translation for the text. A second instance of text is received. If only the first instance is present, the first logical pointer value is assigned to the second instance. If a third instance of the text is present, associated with a second translation and a second logical pointer value, user or process input is received determining whether the first logical pointer value or the second logical pointer value is assigned to the second instance. Context information can be provided to a user to help determine whether the second instance should be associated with the first translation or the second translation.

In one embodiment, the present disclosure provides a technique useable to associate a second instance of translatable text with a translation available for a first instance of the translatable text. A first set of one or more words in a first human language is received. A first logical pointer value is assigned to the first set. At least a first translation of the first set of one or more words in a second human language is provided at a target of the first logical pointer value.

A second set of one or more words in the first human language is received. It is determined that the second set is equal to the first set. A third logical pointer value is assigned to the second set. The third logical pointer is assigned in one of two ways.

In a first way, the first logical pointer value is assigned as the third logical pointer value without receiving user input. This can represent a situation when reuse of translations for existing source/reuse text is mandatory, and there is no ambiguity as to what translation should be used.

In a second way, it is determined that the first set is associated with at least a second logical pointer value. A target of the second logical pointer value includes a second translation of the first set. That is, the first set correspond to source/reuse text where multiple translations exist, such as because the source/reuse text can have different meaning in the source language, resulting in different translations in at least one language into which the source/reuse text is translated. It is determined that the first logical pointer value or the at least a second logical pointer value is to be assigned to the second set as a selected logical pointer value. The selected pointer value is assigned as the third logical pointer value.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 10 is code for an example artifact definition for a database view.

FIG. 11 is code for an example artifact definition for a database view, and for artifact definitions which modify or refer to such example artifact definition.

FIGS. 13A and 13B are example tables illustrating how artifact definitions can be stored in a relational format.

FIG. 15 provides example database tables illustrating how artifact definition information presented in FIG. 14 can be stored in a relational format.

FIG. 16 is a schematic diagram illustrating how artifact definitions can have fields that are defined with respect to other artifact definitions.

FIG. 17 provides an example database table illustrating how artifact definition information presented in FIG. 16 can be stored in a relational format.

FIGS. 22 and 23 present example tables that can be used to carry out operations requested through a data access service that provides access to artifact definitions and extensions thereto.

FIG. 24 presents example code that can be used to annotate a user interface service displaying artifact definition information.

DETAILED DESCRIPTION

Example 1—Overview

Figure 1:
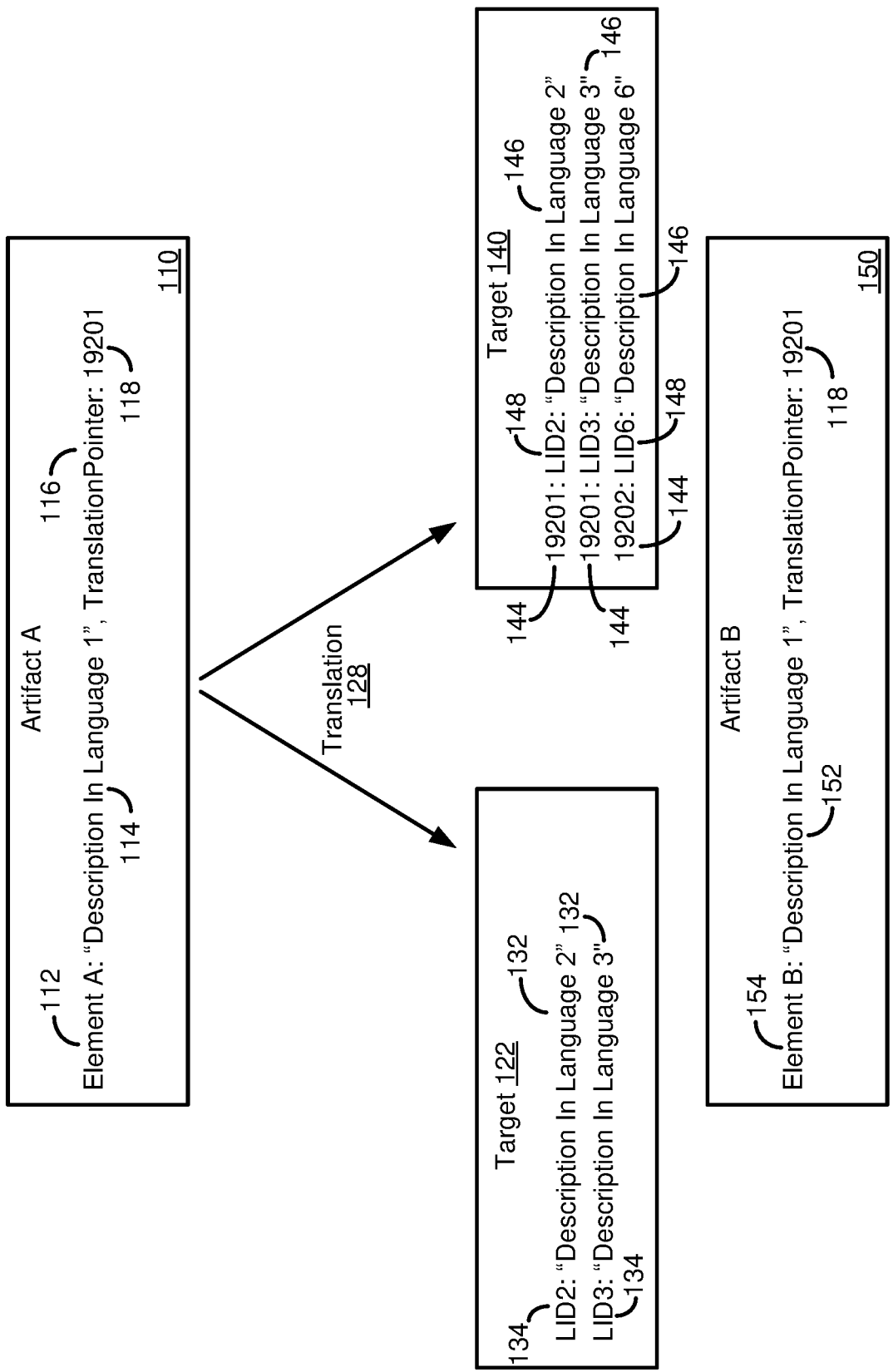
FIG. 1 is a diagram illustrating how logical pointers can be used by multiple text instances to point to a common translation.

Software typically has a number of user-facing elements, whether that might be code having human-language elements, such as string values, or elements that are provided to various types of software users, including end users (where the information provided to end users can include string values specified in code). Typically, software is at least primarily written in a source human language (as opposed to the programming language used, where the source human language can refer to text provided to end users, but could also indicate things such as variable names or information in comments, as opposed to elements of the programming language, such as "IF" statements), which may be a language used by the primary target audience for the software or to facilitate software development. Situations can exist where, for example, software elements of primary use to a developer (such as variable names) in are in one language and elements primarily directed to software users (such as user interface elements) are in a different language.

However, it may be desirable to have at least some software elements available in a language used instead of, or in addition to, a source (or base or standard) language. For instance, for a user interface, it may be desirable to have elements presented on a user interface in a language (human language, as opposed to a computing language) that is different than a source or base language. If a software application is to be used in Japan, and an insufficient number of Japanese users might be expected to be proficient enough in English (serving a source or base language), it may be desirable to have at least some language elements presented to a user in Japanese, or to allow a user to select, or otherwise, view Japanese or English text.

However, manual translation of text, even using computer-implemented tools such as machine-translation, can be highly resource intensive, both in terms of computing and human resources. Prior attempts to address these issues have been unsatisfactory in at least some aspects. Accordingly, room for improvement exists.

In particular, some prior techniques have allowed translations for previously encountered text to be reused. For example, a repository can be automatically or manually searched against a dictionary or repository of text that has been entered into a translation framework. If matching text is available, a user can optionally choose to use the existing translations. In one implementation, a logical pointer is assigned to translated text. The logical pointer can be dereferenced (or followed) to retrieve one or more translation (for example, by including, in a translation request, identifiers for one or more languages for which a translation is desired).

However, adoption and other issues can be encountered with these prior approaches. One issue of concern for users is whether text in a repository, or particular translations, will be stable. For instance, a user may choose to implement their own translation for particular text if they are concerned about whether that text will still be in the repository in the future. The text might be completely deleted from the repository or changed to different text (e.g., it may be decided that an originally used term be deprecated in favor of a new term). Or, a user may be comfortable with a particular translation available when the text is originally entered, but may be concerned that the translation may change over time, even if the same source text is still in the repository. For example, a change in source text or translation may fit one set of circumstances, not the circumstances of other users.

Apart from stability concerns, users may be reluctant to particulate in translation reuse due to effort in accessing and searching a text repository. In addition, even if text appears in a repository, it may be unclear what of multiple possible meanings (translations) have ascribed to particular text.

Another deterrent to participating in a translation reuse system occurs if users who enter text are responsible for providing translations. A user may be reluctant to make text available for reuse because the user is concerned about possibly inaccuracies in the translations they may provide, or because they may not believe they will personally benefit from text reuse, including given the effort it may take to enter text into a reuse system. That is, a user may not even consider the issue of reuse because a single instance of the text and its translation may be suitable for the user's purposes, such if a number of data artifacts use text and its translations by reference to a "base" data artifact. The lack of participation in a text/translation reuse system further limits its usefulness, as there may not be enough "critical mass" to encourage its use.

The present disclosure provides techniques that can facilitate the reuse of translatable text, and translations thereof. When at least certain text in an original or source language that is to be associated with translations is designated, an identifier for the text can be created. The identifier can then be associated with translations of the source text into one or more different languages. Thus, the identifier can serve as a logical pointer to translations for the text. At appropriate points in time, such as the assembly of a software package or at runtime, the pointer can be followed (dereferenced) to obtain a translation in desired language.

When text is entered, a repository of previously translated text elements (e.g., discrete words, phrases, or other groupings of characters that are typically defined using the syntactic properties of the relevant human language, or based on the semantics of the text) can be analyzed. If the text elements appear in the repository, the text elements being entered are associated with the same logical pointer value as the originally entered text. As opposed to prior techniques, this reuse is mandatory, at least for text elements associated with the text reuse framework. The present disclosure includes features that help assuage concerns users may have regarding text/translation reuse Disclosed techniques can provide a number of advantages. If text being entered (or previously entered text being analyzed) can be matched with the same or equivalent text, the new text can be assigned information useable to locate an existing translation. Reusing text in this way can save costs in having humans or computing processes determining redundant translations. In addition, reuse of translations can reduce storage needs, as multiple translations for the same text need not be stored. Reuse of translations can also provide greater consistency or reduce the chance for translation errors, since otherwise it is possible that human or machine translations may provide different translations for the same input. Disclosed techniques also address user concerns regarding issues such as text and translation stability, and thus make mandatory translation reuse feasible.

If text being entered or analyzed does not match existing text associated with a translation, a new pointer can be created, and optionally an appropriate computing object or element (e.g., a file, document, or code containing translations, or to which translations can be added) can be created to serve as the target, such as a target object, of the pointer. The pointer can then be assigned to new instances of the text as described above.

In some cases, the same source text can be associated with multiple translations, having different meanings. For example, the term "bank" in English can have a number of different meanings, one or more of which may be associated with different translations in a target language (e.g., "bank" could be "bank," "ufer," or "reihe," among other options, in German, depending on the particular intended meaning). Thus, while text may be unambiguous in the source language (for example, "bank" can have multiple meaning in English, assuming that is the source language, but that is the "correct" term), it can be ambiguous in a target/translation language (because the translation to be used for "bank" depends on the intended meaning of "bank" in English).

While text reuse is mandatory, in situations where multiple translations are available/the meaning of source text is ambiguous, a user can be prompted to select a particular translation (or translation set, corresponding to a particular logical pointer value) to be used for a particular instance of the reuse text. Continuing the example above, if a user selects "bank" in the sense of a financial institution, a first logical pointer value is assigned that provides the German translation of "bank." If the user selects "bank" in the sense of a row or collection of objects, a logical pointer is assigned that resolves to the German term "reihe."

The existence of improper translations can be determined by various means, including by having a process (e.g., a machine learning/translation process) or users review reuse text instances for improper translations. Or, an error reporting scheme can be provided where end users or developers can flag a translation as being inaccurate, which can trigger a review.

Various information can be provided to a user select between multiple possible translations (each with a different logical pointer value). In some cases, particularly when a user may be multilingual, the actual translations for a particular pointer value can be provided. In other cases, contextual information for artifacts where a given translation/logical pointer value is used can be provided to a user, such as a name of an artifact (such as an entity or entity type) with which the logical pointer is associated or other elements of such an artifact (e.g., "bank (business partner)" versus "bank (construction site)"). Similarly, semantic information, such as a semantic domain, can be associated with a logical pointer value/proposed translation (e.g., "bank (geography)" versus "bank (finance)"). In the case of semantic and contextual information, this information can, at least in some cases, be stored with the translation information.

Reuse text, also referred to as source text, can be single words or a plurality of words. In some cases, the reuse text is defined as a unit of user input, or otherwise indicated as being treatable as a unit, such as enclosing text within quotation marks. Or, a computing process, such as one using machine learning, can determine a likelihood that multiple words should be maintained as a translation unit.

When multiple words are included in a translation unit, combinations of words can be used to determine the meaning of individual words, as well as of the collection of words overall. Similarly, if text to be translated is associated with other text, such other text can be used in determining an appropriate translation of the text to be translated.

Continuing the example above, assume that "bank withdrawal" is the unit of translation. "Withdrawal" can be used to determine that "bank" should be translated with the meaning "financial instruction" rather than "area of land bordering a body of water."

As discussed above, one issue that can arise in the reuse of translations is concern over the stability of translations. That is, for example, a software developer may be reluctant to use an assisted translation process that reuses translations if there is a concern that the original translation may be modified or deleted. Therefore, in at least some implementations, a modification of a translation can result in a new logical pointer and pointer target being created.

As for concerns regarding the stability of the source text, the present disclosure helps address these concerns by creating new entries/logical pointer values when new text is entered/existing source text is updated. The new text can be linked to older text. In a similar manner, old translations can be linked to new translations. In this way, if desired, existing uses of source text can remain unaffected by changes to source text or a translation thereof, while new terms and translations can be adopted. This stability helps allow for a mandatory reuse process. Linking changed source text/translations to changed source text/translations can help ensure that terminology and translations are accurate and up to date. Some changes/updates can be automatic, while others can be left to the discretion of a particular user or process.

Alerts can optionally be provided indicating that a new or updated translation or reuse text is available, so that a user or process can determine whether to maintain an original translation or reuse text or update a logical pointer value to point to a modified translation or reuse text. In at least certain cases, translations changes do not alter at least some existing uses of the corresponding logical pointer.

Deletions of a translation or source text can be handled in a similar manner as translation changes. That is, the deletion of translated text from an original source usage need not result in the deletion of the logical pointer value and its target. The logical pointer value and target are available to other code using the logical pointer value.

Maintaining logical pointer values and targets can result in situations where logical pointer values and storage resources are consumed for translations that are not actively being used. If these issues are of concern, various "garbage collection" mechanisms can be implemented, such as maintaining a counter that tracks a number of usages of a given logical pointer value, where the logical pointer/target can be removed if the counter decrements to zero. Or, a logical pointer value/target can be removed if the logical pointer has not been dereferenced (or otherwise used) within a threshold period of time.

In many cases, such as in various artifacts in a data model or artifacts in a schema (such as a virtual data model or a physical data model, such as for a relational database), artifacts can reference other objects. As an example, a view artifact (e.g., a database view or similar construct) at a particular hierarchical level can refer to one or more lower-level views or entity types (e.g., tables). It is common for some elements of lower-level artifacts to be propagated to, or used in, higher-level objects.

The present disclosure provides techniques that can assist in allowing reuse of text translations between artifacts in a hierarchy. In one implementation, when a target artifact references a source artifact, certain elements, such as annotations (for example, semantic information that describes technical information/data in an artifact) from the source artifact are copied to the target artifact. This copying process can be defined to copy translation information. For instance, at least some textual elements and their associated logical pointer values (pointing to translation information) can be copied from a source artifact to a target artifact.

In another paradigm, annotations are included in a target artifact, but reference the source artifact instead of being separately copied. It may be difficult for a user examining an artifact definition to determine which annotations are inherited and which are copied. In some cases, this issue can be addressed by defining different annotation tags for inherited versus copied annotations, or otherwise supplementing an annotation with information about whether it is inherited or copied (this could be in the form of programming "comments" which are intended to provide information to a user or process, but not to be "executable"). One drawback with having inherited translation information, such as in the form of annotations, is that inheritance can go through multiple levels, and thus a higher-level annotation may need to be followed through multiple data artifacts until the "base"/target annotation is located.

As described, users can be provided with information to help them determine what translation to be used for reuse text that is ambiguous/has multiple meanings(each with a different logical pointer value). In some cases, particularly when a user may be multilingual, the actual translations for a particular pointer value can be provided. In other cases, contextual information for artifacts where a given translation/logical pointer value is used can be provided to a user, such as a name of an artifact (such as an entity or entity type) with which the logical pointer is associated or other elements of such an artifact (e.g., "bank (business partner)" versus "bank (construction site)"). Similarly, semantic information, such as a semantic domain can be associated with a logical pointer value/proposed translation (e.g., "bank (geography)" versus "bank (finance)"). In the case of semantic and contextual information, this information can, at least in some cases, be stored with the translation information.

In some implementations, determining whether to propagate translation or source text changes, as noted above, can also be a consideration. That is, while the disclosed techniques can be used in a variety of scenarios, some scenarios involve the use of translatable text in data artifacts (or, more generally, in computing constructs). In some cases, these data artifacts can be related to one another, and it can be useful to consider whether changes to source text or translations should be propagated to related artifacts. The propagation feature can be implemented separately from translation reuse techniques, or can be integrated therewith.

Propagation, in some scenarios, can be enforced, such as propagating a new logical pointer value to at least some artifacts using an old logical pointer value, or simply changing the translations in an exist logical pointer target or source text without providing "notice" to those using affected artifacts (or other use instances of the relevant source text). In other cases, text reuse instances where a logical pointer may be updated can be presented to a user or process to confirm whether a logical pointer value should be updated. These changes can be presented, for example, when a relevant artifact is saved, loaded, updated, etc. When particular changes decisions are made, these decisions can be made at different organization levels. For example, while a software provider may not choose to make some changes globally, a particular user (customer) of the software provider may choose to make global changes.

In order to help determine entities to which a translation change should be made or suggested, a change graph, or similar data structure, can be created. An original instance of source text and its translation(s) can be provided as a vertex (or node), such as a root. If the source text or its translations are modified, a new node can be added to the graph and linked to the parent node. Similar actions can be taken for this new, child, node if its translation or source text are modified. The nodes can also include logical pointer values for their associated translations. Optionally, entities (or data artifacts or other computing constructs that use reuse text/a logical pointer value) that use a particular node (source text/translation version or instance) can be tracked.

"Graph" can be a construct useable to understand relationships between changed source texts/translations, but tracking relationships between source texts/translations can be implemented in manners that do not require graph data structures. For example, an updated text or translation can be associated with an identifier of its predecessor text or translation. The result can be equivalent to a linked list, where links between text/translations versions can be followed beyond immediate successors/predecessors.

The graph can be traversed from another vertex when an artifact (or, more generally, a file) containing reuse text is opened, saved, or otherwise analyzed, or an analysis process is otherwise initiated. That is, the graph can be used to determine instances of an older translation or source text version should be updated, or users or processes prompted to update, to a newer translation or source text. If several updates are available, a most recent update can be selected, or a user or process can choose to use a translation that is updated as compared with a currently referenced translation, but it not the most up to date version of the translation.

The change graph can optionally be used in garbage collection processes, as described above. Nodes/edges may be removed when a particular instance of a logical pointer value is removed (e.g., the text is removed from a data artifact). In at least some cases "anchor information," such as to identify a logical pointer value and its linkages to other nodes, are maintained even if source text/translations for a particular node are removed. Among other things, this information can be useful in helping migrate uses of the deleted node to a newer (otherwise, replacement) node.

Although not limited thereto, disclosed technologies can be used in artifact formats such as ABAP, CSN, JSON, or XML. CSN (Core Schema Notation), used in software available from SAP, SE, of Walldorf, Germany, can be considered as SQL statements enriched with annotations or semantic information. Similar data artifacts can be defined using JSON, XML, or other formats. Particular artifacts can be for CDS, Core Data Services, and data artifacts therefore, such as CDS views, as implemented in technologies available from SAP, SE, of Walldorf, Germany.

Example 2—Example Artifacts Supporting Translation Reuse

FIG. 1 illustrates a general scenario in which disclosed technologies can find use. FIG. 1 illustrates an artifact 110, "Artifact A", that includes an element 112 and a description 114 of the element in a first human language. The description 114 constitutes text that is to be translated into one or more other human languages. More generally, the element 112 is associated with text to be translated, regardless of whether such text "describes" the element 112.

The description 114 is associated with a logical pointer 116, which is assigned a value 118. The value 118 can be followed/dereferenced to obtain translations for the description 114. In some cases, the value 118 is automatically assigned when the description 114 is entered, or when an indication (e.g., a particular token) is provided that the description 114 is to be translated.

When the value 118 is first assigned, a translation process 128 can be used to provide one or more translations 132 in different languages. The selection of translation languages can be manually selected when the artifact 110 is defined, a default set of languages can be provided, or languages can be selected as part of the translation process 128. A given translation 132 can be associated with a language identifier 134, where the language identifier can be used to select a translation in a particular language. In some cases, an interface can accept as arguments both a logical pointer value and a selection of one or more languages for which a translation 132 is desired to be retrieved. Language selection can also be indirect. For example, a user may select a localization paradigm, where particular human languages may be associated with various localization options.

The translations 132 are shown as being in a target 122, which can be an instance of a particular data type that holds translation information and is specific to the logical pointer value 118. In other cases, multiple logical pointer values 144 can be stored in a single target (or target location)140, such as a particular file, computing object, data type instance, or data structure. Logical pointer values 144 can be associated with one or more translations 146, and the translations can be associated with language identifiers 148, in a similar manner as described for the target 122.

Suitable logic, such as an interface, can retrieve desired translations 146 using an input logical pointer value 144, optionally combined with one or more language identifiers 148 (or an indication, for example, that all translations 146 should be retrieved). In some cases, the target 140 can be implemented as a relational database table, where the logical pointer values 144, translations 146, and language identifiers 148 can be columns of the table.

Another artifact 150, "Artifact B", includes a description 152 for an element 154 that is the same as the description 114. Optionally, since the description 152 and 114 are the same, the logical pointer value 118 can be used in the artifact 150, allowing the translations 132 or 146, depending on the implementation, to be shared by the data artifacts 110, 150.

Note that, at least in some cases, the descriptions 114, 152 are allowed to be reused even if they are not used in the same context, such as being used with the same elements 112, 154. In other cases, sharing of logical pointer values can be confined to specific element types or the same value for a given element type. As an example, the logical pointer value 118 could be reused in the artifact 150 only if the descriptions 114, 152 both related to a particular type of user interface element, or if they both related to the same user interface element.

Figure 2:
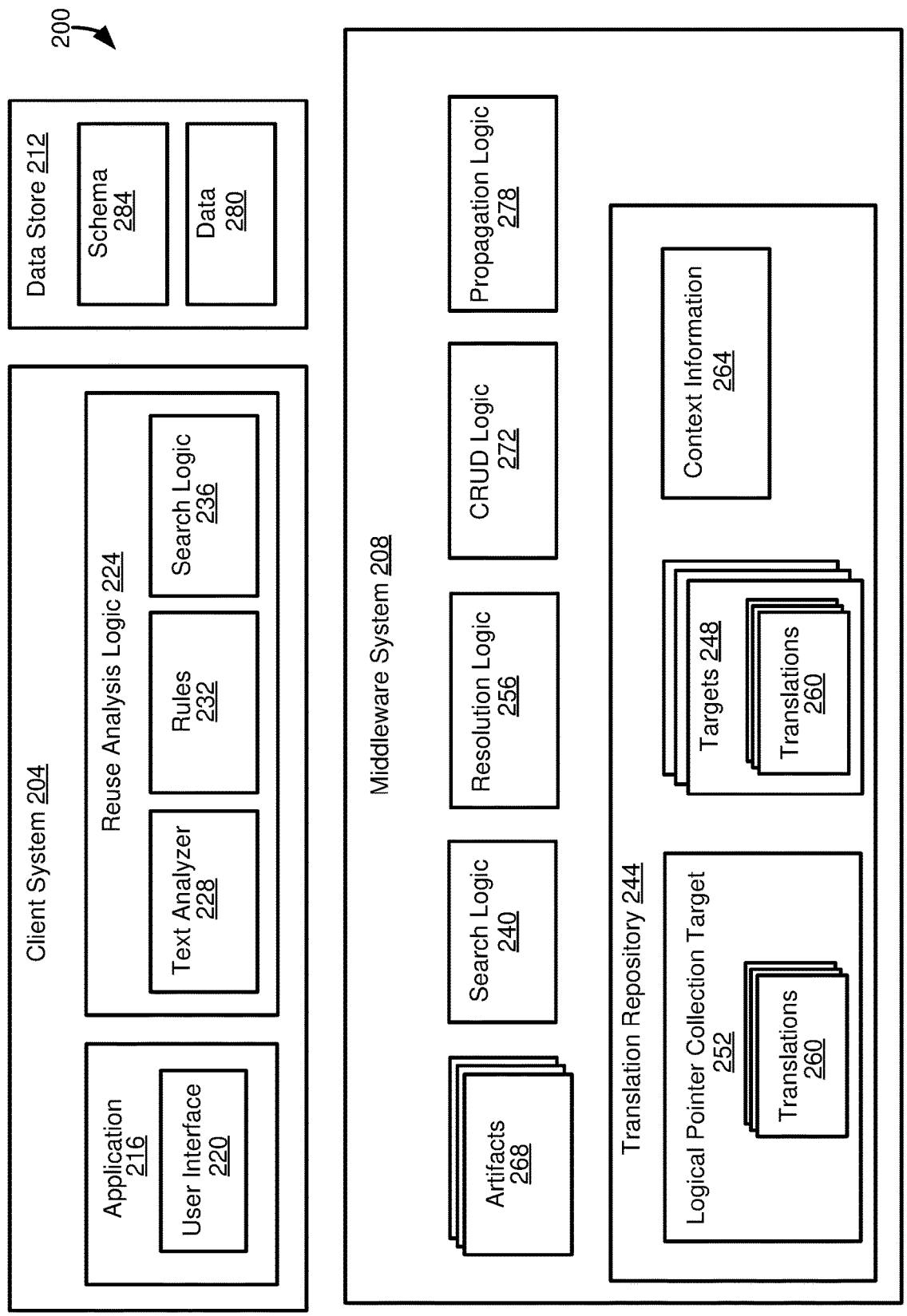
FIG. 2 is diagram illustrating an example computing environment in which disclosed technologies can be implemented, having a translation repository.

Example 3—Example Computing Environment with Components Facilitating Translation Reuse FIG. 2 illustrates a particular computing environment 200 in which disclosed technologies can be implemented. The computing environment 200 includes a client system 204 that is in communication with a middleware system 208, which in turn is in communication with a data store 212, such a relational database. Various components and functionalities are described as being, or occurring, in the client system 204, the middleware system 208, or the data store 212. However, this is only one possible way in which the components and functionalities can be implemented. Components and functionalities can be implemented in a computing environment other than as shown in FIG. 2, such as having some or all of the functionality or components of the client system 204 incorporated into the middleware system 208, or having some or all of the functionality or components of the middleware system incorporated into the data store 212, etc.

The client system 204 is shown as including an application 216 and reuse analysis logic 224. Among other things, the application 216 can include a user interface 220, where the user interface can be used in creating or updating artifacts, including artifacts having translatable text that is associated with reuse technologies described here. The application 216 can also represent an end user application. That is, an application can be one that a developer uses to create artifacts, for example, such as an IDE. An application can also be an application used by an end user, where translation information may be requested/provider to the end user in the user interface 220. An end user application, in some cases, issues requests to deference a logical pointer value to obtain a translation.

The reuse analysis logic 224 can include a number of functions or components. For example, the reuse analysis logic 224 can include a text analyzer 228. The text analyzer 228 can be used to analyzer text entered through the user interface 220, such as to determine whether text triggers application of reuse technologies and to obtain parameters to be used in carrying out actions using disclosed translation reuse techniques.

One or more rules 232 can be used by the text analyzer 228, or more generally by the reuse analysis logic 224. The rules 232 can define, for example, particular tokens that trigger various actions by translation reuse techniques (e.g., flagging text for entry in a reuse system or providing reuse text as suggestions). The reuse analysis logic 224 also includes search logic 236. The search logic 236 can be used to analyze text provided through the user interface 220. For example, the search logic 236 can analyze textual tokens and search a repository of existing text in the reuse framework to aid in determining whether text being entered is new text or corresponds to existing text. If the text being entered corresponds to an existing reuse text, and is associated with a single instance/logical pointer value, the logical pointer value can be assigned to the text being entered. If multiple instances/logical pointer values exist for the test being entered, suggestions can be provided through the user interface 220 so that a user can choose to select an existing translation.

The search logic 236 can assist a user by providing suggestions (either for single translation instance reuse text or multi-translation reuse text) dynamically as text is being entered (e.g., autocomplete), or by providing suggestions to address typographical errors/misspellings. As has been described, if reuse analysis logic 224 (including particular components) identifies possible translation matches for text being entered through the user interface 220, these suggestions can be displayed on the user interface, optionally with translations for particular suggestions or context information for particular suggestions.

Although described as occurring as a user is typing, disclosed techniques can be used to analyze exiting text, such as text in a previously defined artifact. The user interface 220 can be used to confirm or reject suggestions for translation reuse (at least in the case where source text has translation ambiguities).

Information from the client system 204 can be sent to the middleware system 208. For example, the search logic 236 can send search parameters to search logic 240 of the middleware system 208. Results, such as existing text with translations, can be returned to the client system 204 to be shown in the user interface 220.

The search logic 240 can search text in a translation repository 244. As described with respect to FIG. 1, translations can be maintained in individual targets 248, or can be maintained in a collected target 252, where the collected target maintains translations for multiple text elements/logical pointer values. If matching text is found in the repository 244, the results can be returned to the client system 204, such as to be displayed on the user interface 220, and/or logical pointer values for the result(s) can be automatically assigned to the text instance being entered by the user. Optionally, resolution logic 256 can be used to referenced to follow pointers for the relevant text, including to retrieve translations 260 associated with relevant text, or context information 264 (for example, identifying a subject matter area for a translation or identifying other information, such as an entity type, associated with text originally associated with a translation).

In some cases, the translation repository 244, or another component, can contain a list, such as a database table, that contains reuse texts in a reuse framework, their associated logical pointers, and optionally other information, such as translations or context information. In other cases, this information can be stored in artifacts 268 in which the text appears, and the search logic 240, and optionally the resolution logic 256, can act by analyzing the artifacts.

The middleware system 208 can include CRUD (create, read update, delete) functionality 272. The CRUD functionality 272 can be used to create new text entries in the translation repository 244, or to optionally delete or update entries if such actions are permitted. The CRUD functionality 272 can also be used in reading the artifacts 268 or targets 248, 252, and can be generally used by other components of the middleware system 208, including by the resolution logic 256 or by propagation logic 276, The propagation logic 276 can be used in determining when text reuse information should be propagated, such as between the artifacts 268. The propagation logic 276 can include, or can access, one or more change graphs, as described elsewhere in the present disclosure.

The data store 112 can be used to store data 280, such as data associated with the artifacts 268. That is, for example, the artifacts 268 can define, or reflect, a schema 284 that determines at least in part how data 280 is stored. For example, the artifacts 268 can be objects in a virtual data model, which are reflected in objects (e.g., database tables or views) in the schema 284, where the corresponding data associated with the objects is stored in the data 280. Optionally, some or all of the information used by, or described with respect to, the middleware system 208 can be stored in the data store 112. For example, although shown in the middleware system 208, the translation repository 244 can be maintained in the data store 212.

Figure 3:
FIG. 3 provides code for an example artifact definition, where translations are maintained in the artifact definition.

Example 4—Example Modification of Artifact Definition to Support Translation Reuse FIG. 3 illustrates an example data artifact 300 that includes a variety of elements, such as a name/identifier 310 and a type 314. In this case, the type 314 indicates that the data artifact 300 is an "entity." The data artifact 300 can have a variety of additional elements, including those, such as element 318, that serve as "data elements" for the data artifact 300. For example, element 318 can correspond to a field (or attribute) of the artifact. Other elements, such as elements 322, 326, can provide semantic information about another element, in this case the overall artifact 300.

At least some of these elements, such as element 322, can be associated with additional informational, such as semantic information. The semantic information is in the form of a "end user label," which is a description of the element 322 that is displayed to a user. For example, the name 310 of the artifact 300 may be, such as for technical reasons, not easily understandable by, or meaningful to, a human user. The semantic information provided by the element 322 can help address this issue.

However, as has been discussed, the semantic information of the element 322 may be much less useful if it is a human language that the end user does not, or at least does not readily, understand. Accordingly, an indicator 334 can be provided that the semantic information 330 is associated with one or more translations. In the case of the artifact 300, the translations are provided in a translation, or "internationalization," section 338 of the definition of the artifact 300, as indicated by element 342.

In the translation section 338, an indicator 346 can indicate a language in which translations are provided, an indicator 350 identifies the element for which the translation is provided, an indicator 354 indicates the type of the element associated with the indicator 350, and a given entry in the section 338 includes a translation 358 in the language associated with the language indicator 346.

In the example provided by artifact 300, the translation information (e.g., the information in section 338) may be specific to the artifact 300. Thus, if the same text (e.g., "cost center") is used in another artifact or in another manner, that text may also be subject to translation, consuming time and resources, and potentially resulting in inconsistent translations, which can be particularly undesirable if occurring within the same context (e.g., the same user interface screen, or within a single application). Disclosed technologies can help address these issues.

The definition of the artifact 300 can be modified in at least two respects in a disclosed implementation of translation reuse technologies. First, a translation of an element can be modified to use a logical pointer as previously described. Values for the logical pointer can be in the form of a UUID (universally unique identifier), such as using a 128-bit label as in other conventional uses involving UUIDs or similar constructs. Note that the logical pointers can have values expressed in another format, provided that the values are unique within the context or contexts in which they are expected to be used. Second, at least in some cases, only the translated text needs to be used in conjunction with the logical pointer value. As an example, in FIG. 3, an element of the artifact is expressed as: "@EndUserText.label": "{i18n>I_COSTCENTER@ENDUSERTEXT.LABEL}" According to a disclosed technique, this element can be expressed as: "@EndUserText.label": "{i18n>[1234]: "Cost Center"

In the above expression, "i18n>" is a token indicating translatable text. If multiple translation options are available, different tokens can be provided to indicate which translation paradigm is to be used. In the expression above, "1234" is the logical pointer value and "Cost Center" is the translatable text. In this embodiment, the translation section 338 need not be included in the artifact 300. When the artifact 300, or an artifact or other computing construct derived therefrom, is processed, the logical pointer value ("1234") can be dereferenced to obtain translated text. In other cases, an artifact or computing construct derived from the artifact 300 can be instantiated with translations obtained by dereferencing the logical pointer value. Further, while it is often desirable to include the text for which translations are provided in the artifact 330, in at least some cases the text is not included in the artifact, and all text, including in a "source" language, is maintained with the translations.

Example 5—Example User Interface Screens

Figure 4:
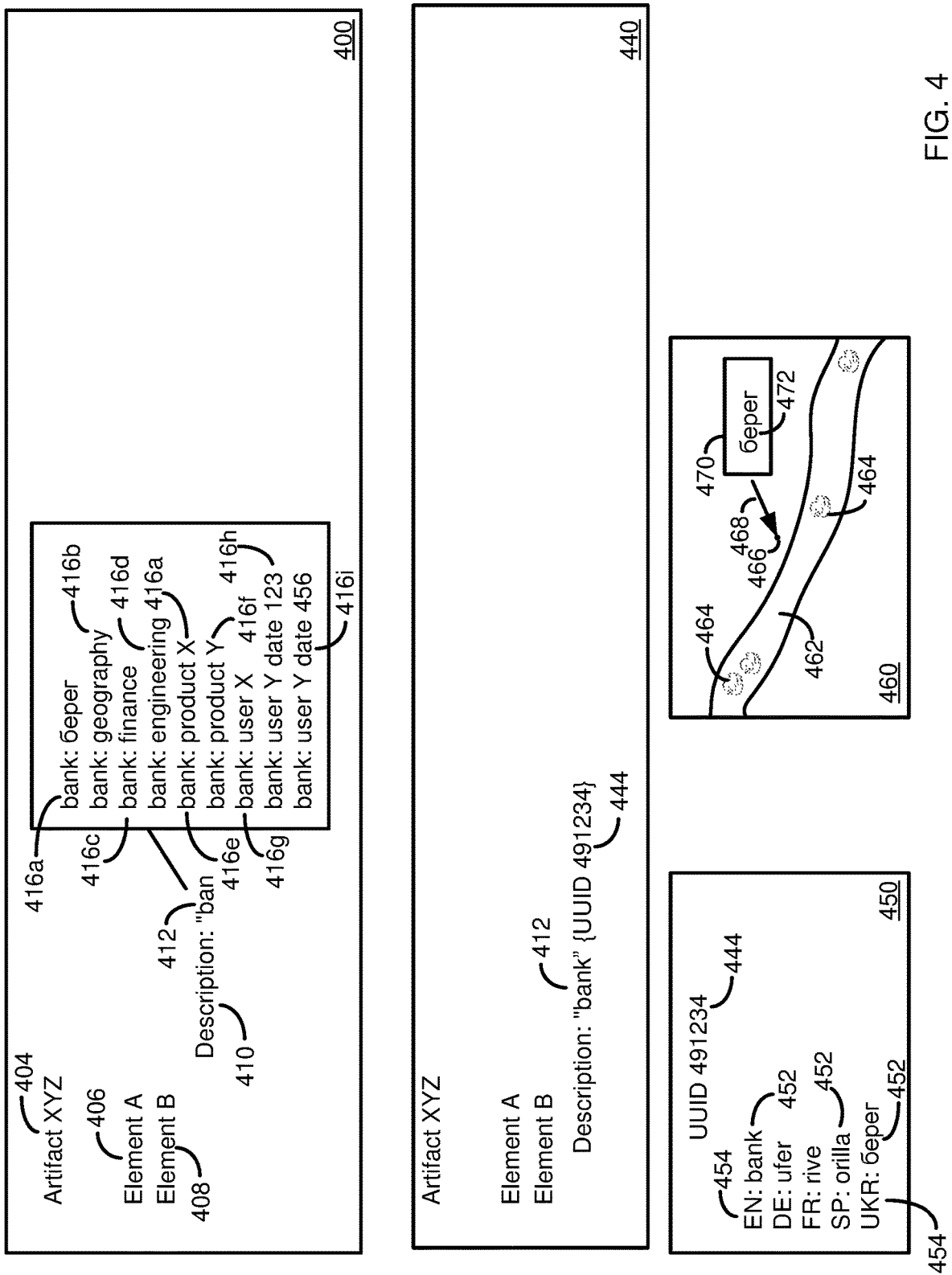
FIG. 4 is a diagram illustrating user interface screens for associating text with logical pointers pointing to text translations, and how these can be implemented on behalf of an end user.

FIG. 4 illustrates example user interface screens 400, 440 illustrating how data artifacts can be defined using text associated with reusable translations. However, the general actions and processes associated with the user interface screens 400, 440, as well as disclosed technologies, can find use in other applications/environments where reusable text translations might be of interest, such as a data object (e.g., classes or similar abstract or composite data types) that define user interface controls or other user interface elements.

The screen 400 represents a process where a user is defining an artifact 404 having a first element 406 and a second element 408, "Element A" and "Element B", respectively. Element 408 is associated with a description 410, such as information that will be displayed on a user interface (e.g., to an end user, where the screen 400 may be used by a developer) in association with element 408 or data associated with element 408. The user is shown as being in the process of entering a value 412 for the description 410.

As the user types, search logic can be used to try and identify existing text in a repository supporting reusable translations. If a match is found, and is unambiguous, the value 110 can be associated with the existing reuse text/translation (e.g., by associating a logical pointer value that can be followed to a translation with the value 110). If more than one possible match is found, the user can be presented with a display 414 of possible matches for the value 412. In this case, assume the user intends to have "bank" as the value. Underlying logic can search based on the characters entered in order to predict from "ban" that the user may intend the value 412 to be "bank." Accordingly, the display 414 can present all or a portion of possible matching text from the repository, as shown for suggestions 416a-416i.

Note that while the search logic is shown as presenting a single reuse text with multiple translations, search logic can also present multiple possible reuse texts, one or more of which may have multiple possible translations. For instance, if a user enters "ban," fuzzy search logic can determine that possible matches might include "bank," "bank withdrawal," "bank account," and these options can be presented to a user.

As has been described, while in some cases a single match may be found, or even no matches, in other cases multiple possible text suggestions may be identified, either as different texts (e.g., "ban" could be "bank" or "banana"), or a text with multiple meanings, which is the scenario of the display 414. All of the suggestions 416a-416i are for the same text, "bank," but each has a different meaning, or is associated with a different context that can assist a user in determining which suggestion to select, or if they indeed want to select any suggestion (e.g., no existing source text corresponds to text being entered by a user).

As for the suggestions 416a-416i, suggestion 416a includes both the suggested text ("bank") and a proposed translation in another language. Optionally, the translations presented can be determined by settings selected by the user, can be specified for a particular project or application (e.g., a code repository), or can represent default behavior. Although a single translation is shown, multiple translations can optionally be displayed for the suggestion 416a.

The suggestions 416b-416d include context information in the form of a semantic context, such as a field of use, for terms. While a word in some languages by have many meanings, other languages may use different words for the different meanings. For example, "bank" could mean a financial instruction, a piece of land bordering a body of water, or a collection of objects (e.g., a bank of computers). Thus, a user can obtain an appropriate translation by simply selecting the suggestion 416b-416d with the appropriate context information.

In a similar manner as the suggestions 416b-416d, suggestions 416e and 416f can include a particular product associated with a possible translation, where the product may be in particular fields such that an appropriate context can be determined. For example, financial accounting software may direct that "bank," as a financial institution is the appropriate translation, while environmental planning software may direct that "bank," as a piece of land bordering a body of water, is the appropriate translation. Suggestions 416g-416i identify particular users who initially created text associated with a reusable translation, optionally associated with a date the text was registered in the reuse framework. The dates, in particular, may allow a user to determine whether an older or newer translation of a term might be more appropriate.

Combinations of information in the suggestions 416a-416i can be used, and other types of information that may assist a user in determining whether to use an existing translation or select from existing translations can be used. For example, a suggestion could provide a suggested translation in addition to a semantic subject matter area, or could include both a date and a suggested translation.

Screen 440 presents the results of a user selecting one of the suggestions 416a-416i. The screen 440 now provides the complete text value 412 (either because a user finished typing or as a result of choosing to autocomplete) and a logical pointer value 444 associated with the selected "reuse text" (i.e., previously entered text associated with one or more translations in a translation reuse framework).

Panel 450 represents how information might be stored in a translation target, such as one of the targets of FIG. 2. The panel 450 includes the logical pointer value 444 and multiple translations 452, where each translation is associated with a language identifier 454. Optionally, information in the panel 450 can be presented on the user interface screen 400 or the user interface screen 440.

Screen 460 illustrates how the data artifact 404 and a selected reuse text, as indicated by a logical pointer value 444, can be used. In this case, the screen 460 represents a user interface screen provided to an end user. The screen 460 is associated with an environmental planning application or use scenario.

The screen 460 shows a representation of a physical environment having geographic/terrain features, such as a river 462 having a plurality of ducks 464. A user selects a particular coordinate 466 on the screen 460 using a pointer 468 (e.g., a cursor pointer). If the user hovers over the coordinate 466, a label 470 for the coordinate is displayed, where the label contains text describing a terrain feature represented by/present at the coordinate location (in the physical environment represented in the screen 460). In this case, the coordinate 466 is associated with a riverbank. The software is being used with Ukraine as localization information, which may direct that information for the label 468 is to be provided in Ukrainian. Accordingly, the label 468 includes text 472 corresponding to the Ukrainian term for "riverbank."

An issue can arise as to what text, and its associated translations, is to be entered into a translation reuse framework. In the case of individual words, the issue may not exist because translations can be maintained on a word-by-word basis. Typically, reuse text that includes multiple words is received in a defined way, such as by specific user input or through tokens that delimit relevant text (whether initial reuse text or subsequent text to be matched to existing text, or entered as a new reuse text). Breaking larger text collections can lead to erroneous translation results. In a specific implementation, textual tokens are used to define reuse text units. For example, words entered within quotation marks can be treated as a unit (and not broken into smaller sets). Or, optionally tokens can be established that allow particular words or subsets of words in a larger set to be designated as translation units (e.g., "I need to withdraw my money from the /t National Bank/t before it collapses", where "/t" is a token used to indicate the starting and ending points for a translation unit).

In some cases, however, larger sets of words can be broken up into individual words or smaller word sets. If it is determined that a set of words is to be analyzed to determine whether it may be beneficial to break the set into smaller sets (including optionally individual words), the described techniques can use string or text processing techniques (e.g., whitespace detection) to isolate single words.

Grammatical rules, dictionaries, or machine learning techniques can be used to help identify words that are typically used together. In some cases, such techniques can be used to group, or suggest groupings, and words can be translated as a unit. These word groupings can also be used to provide "smart suggestions" as text is being entered by a user—if a word or words being entered by a user are associated with a word grouping, the word grouping can optionally be suggested to a user for both autocomplete and translation reuse purposes. Even if words are translated singly or in smaller grouping units, surrounding words can be used to help suggest reuse text. For example, the surrounding words can help determine an intended meaning—such as "deposit" or "water" being used in close proximity to "bank" helping to determining the intended translation of "bank," regardless of whether these context-indicating words are also translated as part of the same unit as "bank."

Example 6—Example Additional Considerations for Translation Reuse

As mentioned in Example 1, translation reuse can be associated with considerations such as when reuse text is to be propagated to other artifacts, how reuse text is accessed, and whether changes or deletions to reuse text or translations are allowed and, if so, whether, how, or to what extent those changes are propagated to artifacts or computing systems (or, more generally, use instances of the particular reuse text/translations).

Taking first the issue of changes to translations associated with reuse text, one or more paradigms can be used. The changes can occur in various ways. In one case, translations associated with a logical pointer are changed in the existing target. In another case, a logical pointer associated with reuse text is changed to a new value, pointing to a target that contains the updated translations. An advantage of the logical pointer value change approach is that individual uses of the reuse text can be selectively modified to have the new pointer value or to continue to use the original pointer value, and thus continue to use the original translations.

In some cases, it may be desirable to globally enforce a change in terminology (either source text or source text translation). In this case, either the original set of translations in a target can be updated or all uses of a reuse text (at least in a particular system, environment, namespace, etc.) can be updated to have a logical pointer value pointing to the new translations. In other cases, changes can be evaluated for implementation on a case-by-case basis, or using a set of criteria useable to determine particular reuse texts to be updated. A user, in a particular implementation, can be made aware of certain changes, such as when opening or closing a file having reuse text, or upon a request to check whether reuse text is up to date.

Optionally, information can be provided to indicate the nature of a change, which can assist in determining if the change should be applied to particular instances of a reuse text. As particular examples, a change might be because an alternative translation was provided for a reuse text or because an error was corrected in an existing reuse text translation, where each of these cases might be associated with an updated pointer value. A user or process might choose to apply "corrections" with less scrutiny than they might apply in evaluating "alternatives." That is, change processes can be initiated because an existing translation (target information) is added or modified, but also when a new instance of the same reuse text is encountered, where instances of the reuse text are associated with different pointer values. For example, if "bank" originally only had its "financial" definition, and "bank" as a terrain feature was added as an alternative use of the same reuse text ("bank"), then optionally at least some uses of "bank" might flagged for considerations as to whether the original translation was correct, or whether perhaps "bank" with the new translation might have been more appropriate.

As has been discussed, in order to facilitate adoption of aspects of the present disclosure, it can be beneficial not to delete original reuse text. For example, while it may generally be preferable to switch from the term "white list" to "allow list," users may be uncomfortable if they are not confident reuse text will be stable. Deletions may be particularly problematic because reuse text/translations may be used in places outside of a current computing context (e.g., a view stack, model, or schema). Accordingly, in at least some embodiments, reuse texts are not deleted. Changes to source/reuse text instead result in new entries in the reuse framework, where the original source text and the "new" source text have different logical pointer values. As will be further explained, changed text can be linked to original text to help facilitate adoption of updated text (both by increasing awareness of updates and by facilitating the implementation of updates).

Particularly when a decision might be presented repeatedly (such as every time a file is saved or opened), it can be desirable to save an indication of whether a particular change was already evaluated. This indication can be associated with a timestamp, which can be used to determine whether changes are more recent than the timestamp, and should be evaluated, or whether the changes are older that the timestamp, in which case they are not revaluated.

In particular cases, such as when logical pointer values are included in object/artifact/entity definitions, there can be issues in evaluating the pointers, such as to confirm whether they are current, or for purposes of updating the pointers. For example, accessing artifact definitions may involve a redeployment of the entities. Accordingly, it can be useful to maintain a table of used logical pointer values, and optionally an indication of their associated use environment (such as a file, an artifact identifier). This table can be used for verification checks, and affected uses updated as needed.

Figure 5A:
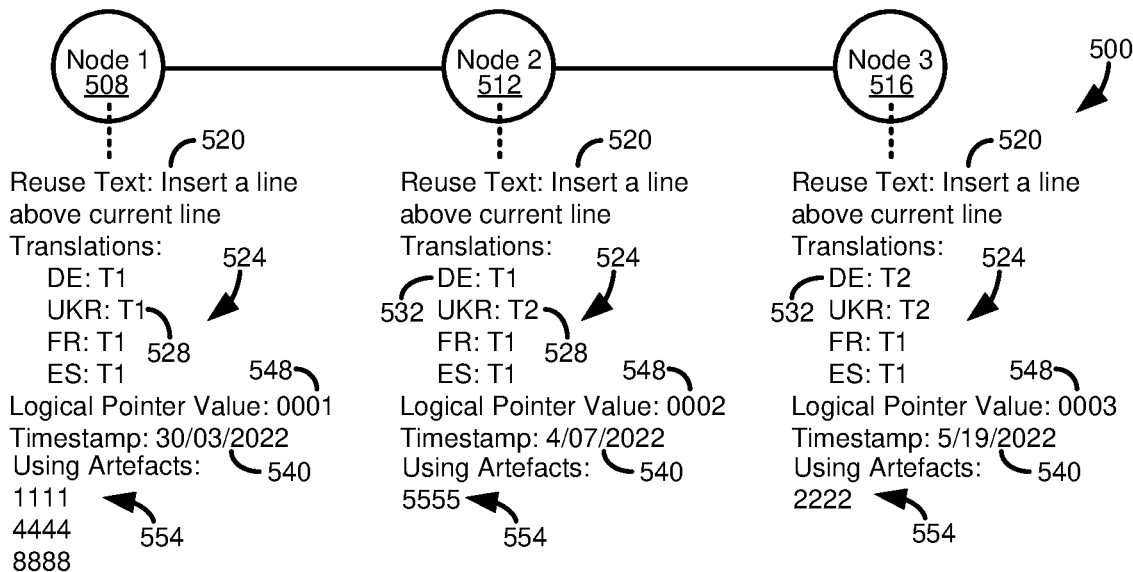
FIG. 5A is a diagram illustrating a change graph that can be used to track translation changes for particular source text.

FIG. 5A illustrates an example of a change graph 500. The change graph 500 can be stored in a data structure, such as a graph data structure, or information can be maintained in another format, such as in one or more relational database tables. The change graph 500 includes nodes, or vertices, 508, 512, 516. The nodes 508, 512, 516 represent different instances of a reuse text 520. In this case, the reuse text 520 can represent a tooltip that is displayable on a user interface.

While the reuse text 520 remains the same between the nodes 508, 512, 516, one or more translations 524 different between the nodes. A new node is created when a translation is modified (or, in some cases, deleted or added). So, node 512 can represent an instance of the reuse text 520 that was created when a value of translation 528 was updated (from "T1" to T2"). Similarly, node 516 can represent an instance of the reuse text 520 that was created when a value of translation 532 was updated (from "T1" to "T2").

The nodes 508, 512, 516 are associated with respective timestamps 540, indicating when a node was created/updated. The nodes 508, 512, 516 are also associated with respective logical pointer values 548 useable to access the translations 524. As has been described, in some cases, a new logical pointer value is created/assigned when a translation for a reuse text is added, modified, or deleted.

The graph 500 (or another data type or data structure instance, such as a relational database table) can track uses of a particular node 508, 512, 516 (i.e., translation version for particular reuse text), such listing what artifacts 554 have been assigned the logical pointer value 548 associated with a given node.

The graph 500 can be used to propagate updates to translations 524. For example, when node 512 is created, the artifacts 554 associated with the node 508 can be updated to have the logical pointer value 548 for the node 512. Or, a user or process can be prompted to accept or reject an update to the pointer value. In other cases, such as when one of the artifacts 554 is accessed or closed, the change graph 500 can be consulted to determine if any translations 524 have been updated/a new node has been created (such as a node further from a root node than a current node with which the artifact is associated).

The timestamps 540 can be used to help track user/process decisions regarding updates. That is, a "last checked time" can be maintained for an artifact 554, and update processes only carried out for nodes that have been created or modified after the "last checked time."

Figure 5B:
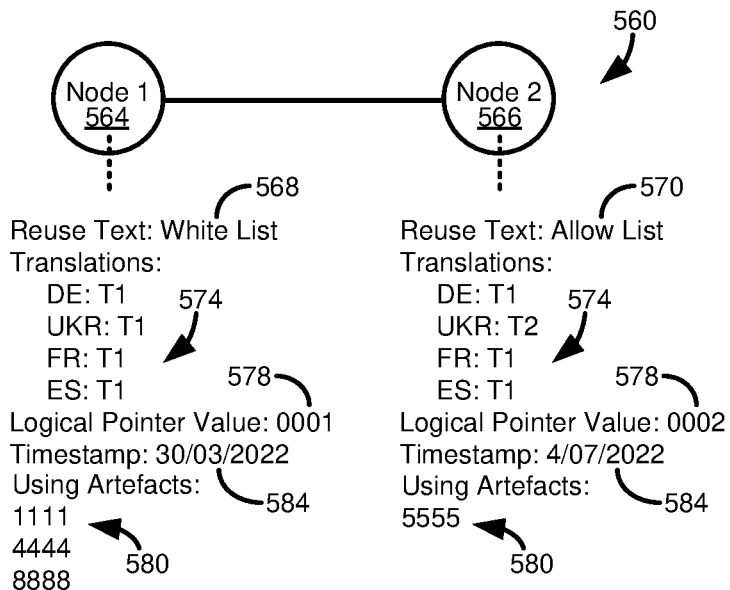
FIG. 5B is a diagram illustrating a change graph that can be used to track changes to source text.

FIG. 5B illustrates a change graph 560 that can be used to track changes to reuse text, rather than translations. In some cases, the reuse text and the translations both change.

The change graph 560 is generally similar to the change graph 500, and is shown as including nodes 564, 566. However, in this case it can be seen that reuse text 570 for the node 566 has been changed as compared with the reuse text 568 for the node 564. Each node 564, 566 includes one or more translations 574 and a logical pointer value 578. As shown, even though the reuse text 568 has been changed compared with the reuse text 570, only one of the translations 574 has changed for the node 566 as compared with node 564. As with the change graph 560, the nodes 564, 566 can include information identifying particular uses of the recuse text 568, 570, such as artifacts identifiers 580.

The change graph 560 can be used in an analogous manner to the change graph 500. For example, when the node 566 is created, it can be determined whether the artifacts 580 should be updated to use the logical pointer value 578 for the node 566 rather than that for the node 564. Or, when one of the artifacts 580 is accessed or saved, the change graph 560 can be consulted to determine whether a new reuse term is available.

The nodes 564. 566 can include timestamps 584 that can be used to help avoid repeatedly analyzing a particular node for data artifacts 580 to be updated, or for analyzing particular data artifacts, as explained in conjunction with the change graph 500.

The change graph 500 or the change graph 560 can be used to remove particular reuse texts or translations. In some cases, a node can be removed from the graph 500 or the graph 560 when no artifacts are associated with the node. In other cases, the graph 500 or the graph 560 can track when a node was last accessed (for example, when the associated logical pointer was last dereferenced), or this information can be maintained elsewhere, and a node can be removed if it was not used within a threshold period of time.

It can be useful to leave information in the change graph 500 or the change graph 560 even if a particular reuse text (or translation) is deleted. That is, it may be useful to leave "anchor" information that includes a logical pointer value and linkages to parent/child nodes. If a reuse text is deleted, maintaining this anchor information can facilitate migrating users to the child/updated reuse text (which can represent a change to source text or a change to a translation of source text).

As an example, a user of a first system may determine that they no longer need particular reuse text (or that, generally, the first system no longer needs the reuse text). However, that reuse text may be used by other systems. In a similar manner as how typically new/changed text results in a new entry, not a modification or deletion of an old entry (improving the stability of a reuse framework), providing anchor information can help migrate users to new texts/translations, even if they use different computing systems and a particular reuse text/translation (e.g., the content, as opposed to anchor information) is deleted.

Garbage collection can be implemented so that anchor information can eventually be removed. In the meantime, maintaining anchor information can allow at least translation information to be removed, freeing computing resources.

Although shown as separate graphs 500, 560, in some cases these graphs can be combined. That is, a given node can have edges to nodes that represent changes to source text and/or edges to nodes that represent changes to translations for the same source text.

Access to reuse content (e.g., reuse text and their associated pointers and targets) can be made available in various ways. In some cases, the information is available from a central repository, whether local to or remote from a system that might use such information. In other cases, if there are multiple users of reuse content, reuse content can be selectively deployed. For instance, a software provider may have many different customers, who use different software products or have different language requirements. In some cases, all translations and reuse texts are deployed for all users. In other cases, only a portion of such translations and reuse texts are deployed, such as only those used in the deployed software products or only those in selected languages of interest to a user (e.g., for a given set of reuse texts, all language translations could be copied or only a subset of such translations).

Example 7—Example Translation Reuse Operations

Figure 6:
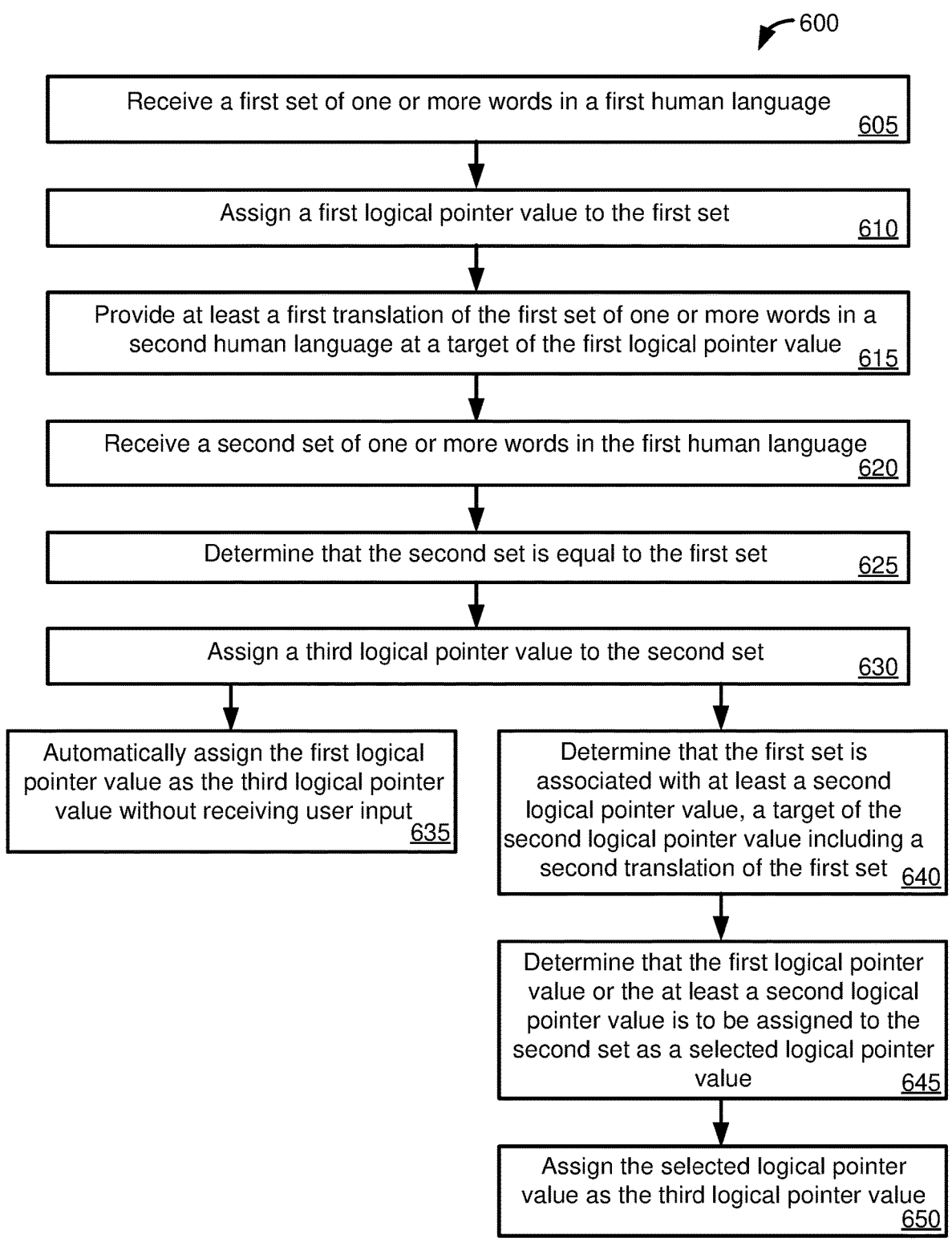
FIG. 6 is a flowchart of an example technique for associating a second instance of translatable text with a translation available for a first instance of the translatable text.

FIG. 6 illustrates a method 600 for associating a second instance of translatable text with a translation available for a first instance of the translatable text. The method 600 can be implemented, for example, in the computing environment 200 of FIG. 2, and can be implemented as shown in FIGS. 1 and 4.

At 605, a first set of one or more words in a first human language is received. A first logical pointer value is assigned to the first set at 610. At 615, at least a first translation of the first set of one or more words in a second human language is provided at a target of the first logical pointer value.

A second set of one or more words in the first human language is received at 620. At 625, it is determined that the second set is equal to the first set. A third logical pointer value is assigned to the second set at 630. The third logical pointer is assigned in one of two ways.

In a first way, at 635, the first logical pointer value is assigned as the third logical pointer value without receiving user input. This can represent a situation when reuse of translations for existing source/reuse text is mandatory, and there is no ambiguity as to what translation should be used.

In a second way, at 640, it is determined that the first set is associated with at least a second logical pointer value. A target of the second logical pointer value includes a second translation of the first set. That is, the first set correspond to source/reuse text where multiple translations exist, such as because the source/reuse text can have different meaning in the source language, resulting in different translations in at least one language into which the source/reuse text is translated. At 645, it is determined that the first logical pointer value or the at least a second logical pointer value is to be assigned to the second set as a selected logical pointer value. The selected logical pointer value is assigned as the third logical pointer value at 650.

Example 8—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary, such as for a virtual data model. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects (or artifacts) through various properties (which can be reflected in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 7:
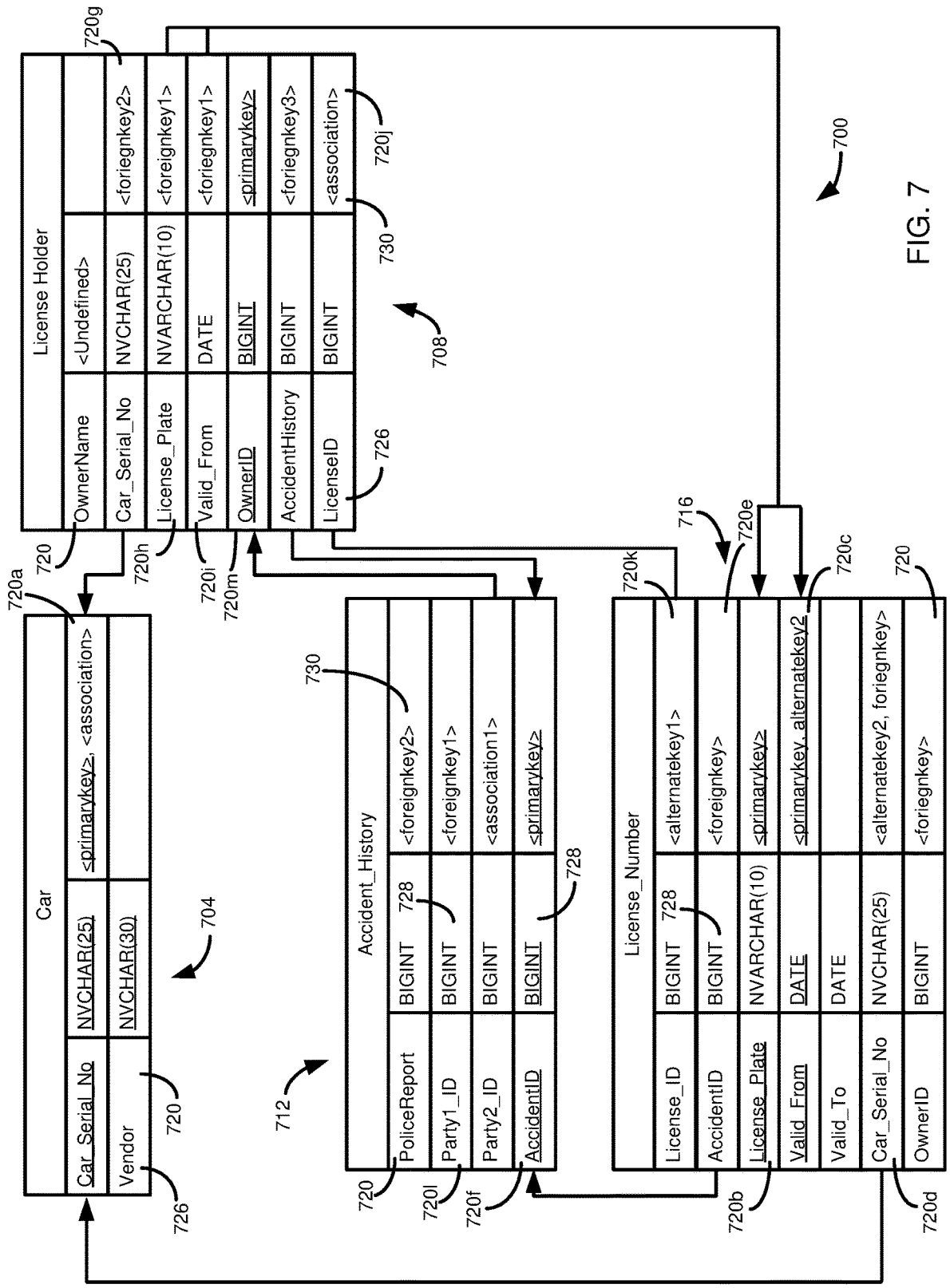
FIG. 7 is a diagram of a database schema showing technical relationships between at least a portion of database tables in the schema.

FIG. 7 is an example entity-relation (ER) type diagram illustrating a data schema 700, or artifact definition, related to a driver's accident history. The schema 700 (which can be part of a larger schema, the other components not being shown in FIG. 7) can include a table 708 associated with a license holder (e.g., an individual having a driver's license), a table 712 associated with a license, a table 716 representing an accident history, and a table 704 representing cars (or other vehicles).

Each of the tables 704, 708, 712, 716 has a plurality of attributes 720 (although, a table may only have one attribute in some circumstances). For a particular table 704, 708, 712, 716, one or more of the attributes 720 can serve as a primary key—uniquely identifying particular records in the tuple and being designated as the main method of accessing tuples in the table. For example, in the table 704, the Car_Serial_No attribute 720*a* serves as the primary key. In the table 716, the combination of attributes 720*b* and 720*c* together serve as the primary key.

A table can reference records associated with the primary key of another table through the use of a foreign key. For example, the license number table 716 has an attribute 720*d* for a Car_Serial_No in table 716 that is a foreign key and is associated with the corresponding attribute 720*a* of table 704. The use of a foreign key can serve various purposes. The foreign key can link particular tuples in different tables. For example, a foreign key value of 8888 for the attribute 720*d* would be associated with a particular tuple in table 704 having that value for attribute 720*a*. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 716, for instance, has an alternate key that is formed from attribute 720*c* and attribute 720*d*. Thus, a unique tuple can be accessed in the table 716 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 704, 708, 712, 716, and the name 726 and datatype 728 of their associated attributes 720. Schema information may also include at least some of the information conveyable using the flag 730, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 9—Example Table Elements Including Semantic Identifiers

Figure 8:
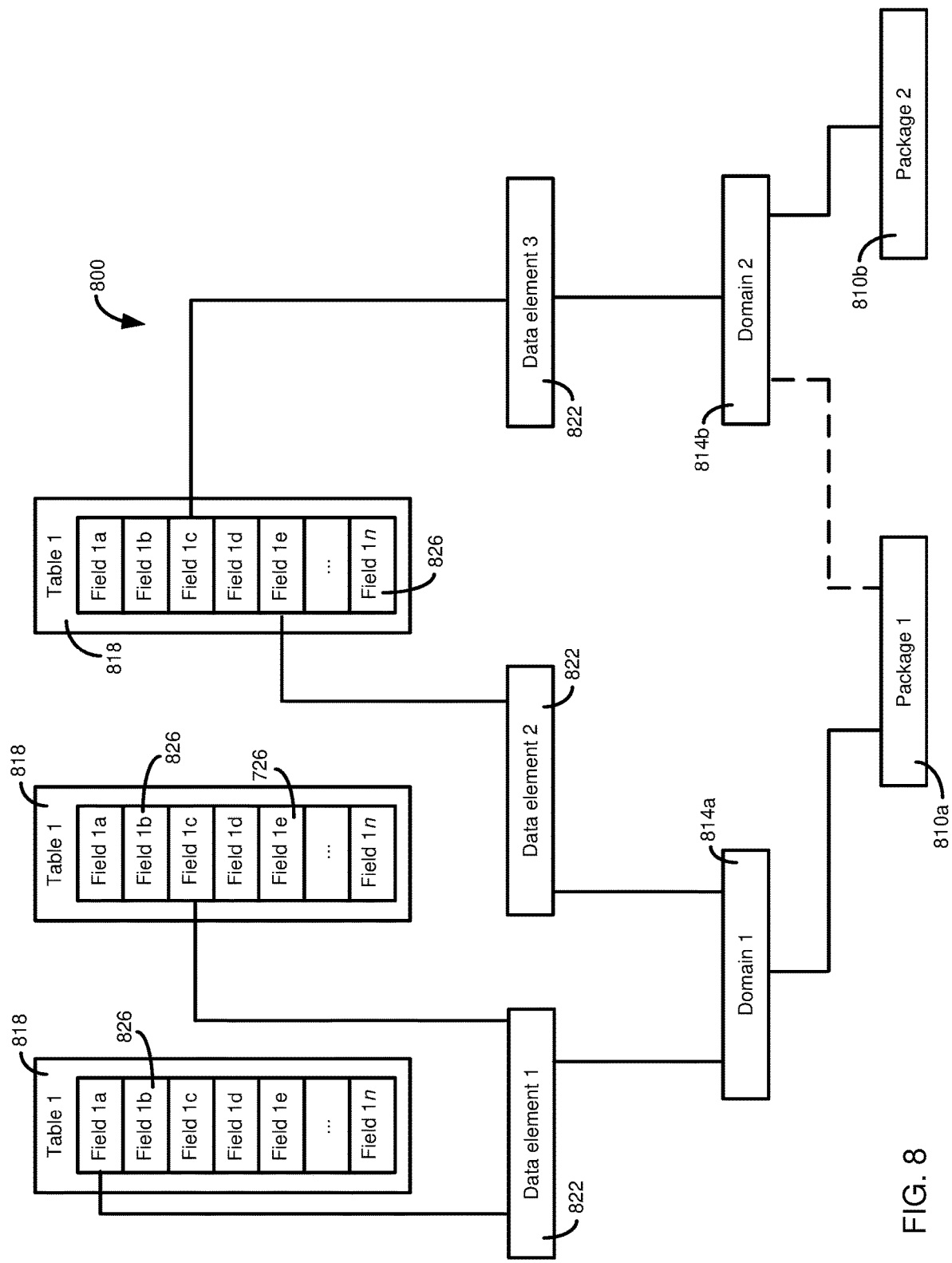
FIG. 8 is a schematic diagram illustrating relationships between table elements that can be included in a data dictionary, or otherwise used to define database tables.

FIG. 8 is a diagram illustrating elements of a database schema 800 and how they can be interrelated. In at least some cases, the database schema 800 can be maintained other than at the database layer of a database system. That is, for example, the database schema 800 (or virtual data model) can be independent of the underlying database, including a schema used for the underlying database. Typically, the database schema 800 is mapped to a schema of the database layer (e.g., schema 800 of FIG. 8), such that records, or portions thereof (e.g., particular values of particular fields) can be retrieved through the database schema 800.

The database schema 800 can include one or more packages 810. A package 810 can represent an organizational component used to categorize or classify other elements of the schema 800. For example, the package 810 can be replicated or deployed to various database systems. The package 810 can also be used to enforce security restrictions, such as by restricting access of particular users or particular applications to particular schema elements.

A package 810 can be associated with one or more domains 814 (i.e., a particular type of semantic identifier or semantic information). In turn, a domain 814 can be associated with one or more packages 810. For instance, domain 1, 814a, is associated only with package 810a, while domain 2, 814b, is associated with package 810a and package 810b. In at least some cases, a domain 814 can specify which packages 810 may use the domain. For instance, it may be that a domain 814 associated with materials used in a manufacturing process can be used by a process-control application, but not by a human resources application.

In at least some implementations, although multiple packages 810 can access a domain 814 (and database objects that incorporate the domain), a domain (and optionally other database objects, such as tables 818, data elements 822, and fields 826, described in more detail below) is primarily assigned to one package. Assigning a domain 814, and other database objects, to a unique package can help create logical (or semantic) relationships between database objects. In FIG. 8, an assignment of a domain 814 to a package 810 is shown as a solid line, while an access permission is shown as a dashed line. So, domain 814a is assigned to package 810a, and domain 814b is assigned to package 810b. Package 810a can access domain 814b, but package 810b cannot access domain 814a.

Note that at least certain database objects, such as tables 818, can include database objects that are associated with multiple packages. For example, a table 818, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 814 (that is, the domains can provide further semantic context for database objects that are associated with an object of another package, rather than being assigned to a common package).

As will be explained in more detail, a domain 814 can represent the most granular unit from which database tables 818 or other schema elements or objects can be constructed. For instance, a domain 814 may at least be associated with a datatype. Each domain 814 is associated with a unique name or identifier, and is typically associated with a description, such as a human readable textual description (or an identifier than can be correlated with a human readable textual description) providing the semantic meaning of the domain. For instance, one domain 814 can be an integer value representing a phone number, while another domain can be an integer value representing a part number, while yet another integer domain may represent a social security number. The domain 814 thus can held provide common and consistent use (e.g., semantic meaning) across the schema 800. That is, for example, whenever a domain representing a social security number is used, the corresponding fields can be recognized as having this meaning even if the fields or data elements have different identifiers or other characteristics for different tables.

The schema 800 can include one or more data elements 822. Each data element 822 is typically associated with a single domain 814. However, multiple data elements 822 can be associated with a particular domain 814. Although not shown, multiple elements of a table 818 can be associated with the same data element 822, or can be associated with different data elements having the same domain 814. Data elements 822 can serve, among other things, to allow a domain 814 to be customized for a particular table 818. Thus, the data elements 822 can provide additional semantic information for an element of a table 818.

Tables 818 include one or more fields 826, at least a portion of which are mapped to data elements 822. The fields 826 can be mapped to a schema of a database layer, or the tables 818 can be mapped to a database layer in another manner. In any case, in some embodiments, the fields 826 are mapped to a database layer in some manner Or, a database schema can include semantic information equivalent to elements of the schema 800, including the domains 814.

In some embodiments, one or more of the fields 826 are not mapped to a domain 814. For example, the fields 826 can be associated with primitive data components (e.g., primitive datatypes, such as integers, strings, Boolean values, character arrays, etc.), where the primitive data components do not include semantic information. Or, a database system can include one or more tables 818 that do not include any fields 826 that are associated with a domain 814. However, the disclosed technologies can include a schema 800 (which can be separate from, or incorporated into, a database schema) that includes a plurality of tables 818 having at least one field 826 that is associated with a domain 814, directly or through a data element 822.

Example 10—Example Data Dictionary Components

Schema information, such as information associated with the schema 800 of FIG. 8, can be stored in a repository, such as a data dictionary. In at least some cases the data dictionary is independent of, but mapped to, an underlying relational database. Such independence can allow the same database schema 800 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 9:
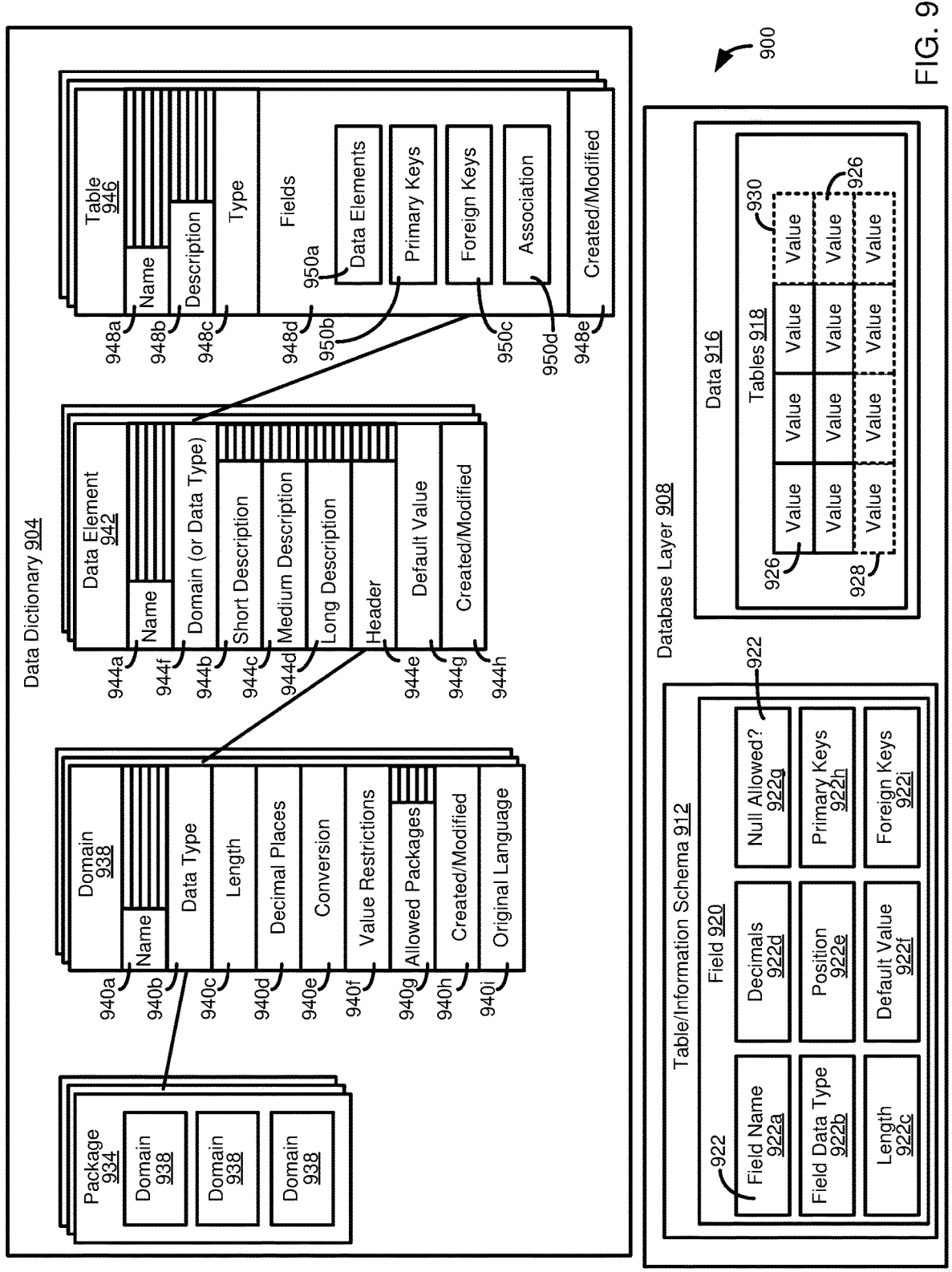
FIG. 9 a schematic diagram illustrating components of a data dictionary and components of a database layer.

FIG. 9 illustrates a database environment 900 having a data dictionary 904 that can access, such as through a mapping, a database layer 908. The database layer 908 can include a schema 912 (e.g., an INFORMATION_SCHEMA as in PostgreSQL) and data 916, such as data associated with tables 918. The schema 912 includes various technical data items/components 922, which can be associated with a field 920, such as a field name 922a (which may or may not correspond to a readily human-understandable description of the purpose of the field, or otherwise explicitly describe the semantic meaning of values for that field), a field data type 922b (e.g., integer, varchar, string, Boolean), a length 922c (e.g., the size of a number, the length of a string, etc., allowed for values in the field), a number of decimal places 922*d* (optionally, for suitable datatypes, such as, for a float with length 6, specifying whether the values represent XX.XXXX or XXX.XXX), a position 922*e* (e.g., a position in the table where the field should be displayed, such as being the first displayed field, the second displayed field, etc.), optionally, a default value 922*f* (e.g., "NULL," "0," or some other value), a NULL flag 922*g* indicating whether NULL values are allowed for the field, a primary key flag 922*h* indicating whether the field is, or is used in, a primary key for the table, and a foreign key element 922*i*, which can indicate whether the field 920 is associated with a primary key of another table, and, optionally, an identifier of the table/field referenced by the foreign key element. A particular schema 912 can include more, fewer, or different technical data items 922 than shown in FIG. 9.

The tables 918 are associated with one or more values 926. The values 926 are typically associated with a field 920 defined using one or more of the technical data elements 922. That is, each row 928 typically represents a unique tuple or record, and each column 930 is typically associated with a definition of a particular field 920. A table 918 typically is defined as a collection of the fields 920, and is given a unique identifier.

The data dictionary 904 includes one or more packages 934, one or more domains 938, one or more data elements 942, and one or more tables 946, which can at least generally correspond to the similarly titled components 810, 814, 822, 818, respectively, of FIG. 8. As explained in the discussion of FIG. 8, a package 934 includes one or more (typically a plurality) of domains 938. Each domain 938 is defined by a plurality of domain elements 940. The domain elements 940 can include one or more names 940*a*. The names 940*a* serve to identify, in some cases uniquely, a particular domain 938. A domain 938 includes at least one unique name 940*a*, and may include one or more names that may or may not be unique. Names which may or may not be unique can include versions of a name, or a description, of the domain 938 at various lengths or levels of detail. For instance, names 940*a* can include text that can be used as a label for the domain 938, and can include short, medium, and long versions, as well as text that can be specified as a heading. Or, the names 940*a* can include a primary name or identifier and a short description or field label that provides human understandable semantics for the domain 938.

In at least some cases, the data dictionary 904 can store at least a portion of the names 940*a* in multiple language, such as having domain labels available for multiple languages. In embodiments of the disclosed technologies, when domain information is used for identifying relationships between tables or other database elements or objects, including searching for particular values, information, such as names 940*a*, in multiple languages can be searched. For instance, if "customer" is specified, the German and French portion of the names 940*a* can be searched as well as an English version.

The domain elements 940 can also include information that is at least similar to information that can be included in the schema 912. For example, the domain elements 940 can include a data type 940*b*, a length 940*c*, and a number of decimal places 940*d* associated with relevant data types, which can correspond to the technical data elements 922*b*, 922*c*, 922*d*, respectively. The domain elements 940 can include conversion information 940*e*. The conversion information 940*e* can be used to convert (or interconvert) values entered for the domain 938 (including, optionally, as modified by a data element 942). For instance, conversion information 940*e* can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 938 can be stored in a repository, such as a field catalog.

The domain elements 940 can include one or more value restrictions 940*f*. A value restriction 940*f* can specify, for example, that negative values are or are not allowed, or particular ranges or threshold of values that are acceptable for a domain 938. In some cases, an error message or similar indication can be provided as a value is attempted to be used with a domain 938 that does not comply with a value restriction 940*f*. A domain element 940*g* can specify one or more packages 934 that are allowed to use the domain 938.

A domain element 940*h* can specify metadata that records creation or modification events associated with a domain element 938. For instance, the domain element 940*h* can record the identity of a user or application that last modified the domain element 940*h*, and a time that the modification occurred. In some cases, the domain element 940*h* stores a larger history, including a complete history, of creation and modification of a domain 938.

A domain element 940*i* can specify an original language associated with a domain 938, including the names 940*a*. The domain element 940*i* can be useful, for example, when it is to be determined whether the names 940*a* should be converted to another language, or how such conversion should be accomplished.

Data elements 942 can include data element fields 944, at least some of which can be at least generally similar to domain elements 940. For example, a data element field 944*a* can correspond to at least a portion of the name domain element 940*a*, such as being (or including) a unique identifier of a particular data element 942. The field label information described with respect to the name domain element 940*a* is shown as separated into a short description label 944*b*, a medium description label 944*c*, a long description label 944*d*, and a header description 944*e*. As described for the name domain element 940*a*, the labels and header 944*b*-944*e* can be maintained in one language or in multiple languages.

A data element field 944*f* can specify a domain 938 that is used with the data element 942, thus incorporating the features of the domain elements 940 into the data element. Data element field 944*g* can represent a default value for the data element 942, and can be at least analogous to the default value 922*f* of the schema 912. A created/modified data element field 944*h* can be at least generally similar to the domain element 940*h*.

Tables 946 can include one or more table elements 948. At least a portion of the table elements 948 can be at least similar to domain elements 940, such as table element 948*a* being at least generally similar to domain element 940*a*, or data element field 944*a*. A description table element 948*b* can be analogous to the description and header labels described in conjunction with the domain element 940*a*, or the labels and header data element fields 944*b*-944*e*. A table 946 can be associated with a type using table element 948*c*. Example table types include transparent tables, cluster tables, and pooled tables, such as used as in database products available from SAP SE of Walldorf, Germany.

Tables 946 can include one or more field table elements 948*d*. A field table element 948*d* can define a particular field of a particular database table. Each field table element 948*d* can include an identifier 950*a* of a particular data element 942 used for the field. Identifiers 950*b*-950*d*, can specify whether the field is, or is part of, a primary key for the table (identifier 950*b*), or has a relationship with one or more fields of another database table, such as being a foreign key (identifier 950*c*) or an association (identifier 950*d*).

A created/modified table element 948*e* can be at least generally similar to the domain element 940*h*.

Example 11—Example Artifact Definition

FIG. 10 illustrates a definition of an artifact definition 1000. The artifact definition 1000, in particular, represents a view, such as a Core Data Services view of SAP SE, of Walldorf, Germany, and be expressed in a format such as CSN. The artifact definition 1000 can include a variety of different components, at least some of which can be considered to be artifact definitions. That is, the artifact definition 1000 can be a model that is based at least in part on multiple sub-models. The sub-models can specify particular aspects of the overall artifact definition 1000.

The artifact definition 1000 can optionally include one or more annotations 1004. An annotation can be a metadata component that can be added to an artifact definition. For example, a provider may supply a base model, and individual users or customers may wish to add metadata that is specific to their operating environment and use cases. The ability to add annotations can thus enhance usability by allowing for custom metadata elements, without impacting other users of a base artifact definition. Annotations can be specified for different software layers or frameworks.

In the example shown, annotations 1004 can be indicated as annotations using particular syntax elements, such as by preceding an annotation with the "@" symbol. In at least some cases, annotations 1004 can also be indicated by placing them in the appropriate portion of an artifact definition, such as in a header section or another section designated for annotations. In some cases, annotations 1004 can reference other artifact definitions, such as an artifact definition of a data source, or can reference a data source that is associated with an artifact definition. In either event, such an association 1004 can create a dependency between the artifact definition 1000 and the other artifact definition/data source.

The artifact definition 1000 can include instructions 1008, in this case a SQL statement 1010, defining a core artifact definition/object having an identifier 1012 (which can be used, for example to later access or activate, such as to instantiate, the artifact definition). In particular, the instructions 1008 shown define a view. The annotations 1004 further specify properties of the view, as do other portions of the artifact definition 1000 that will be further described.

The instructions 1008 can specify one or more data sources 1016. Data sources 1016 can define data to which at least a portion of the metadata of the artifact definition 1000 will apply, and can also supply additional metadata for the artifact definition 1000. Note that the artifact definition 1000 can be, in at least a sense, dependent on referenced data sources 1016. For example, if the artifact definition 1000 relies on particular expected data or metadata of a data source 1016, the artifact definition may be unusable, have performance issues, or provide incorrect results if the referenced data sources do not include expected data or metadata, or are otherwise inconsistent with how the data source is used in the artifact definition. As shown, the data sources 1016 includes two tables, "vbak" and "vbkd." These tables will typically include metadata features such as one or more fields, where each field is associated with a data type, designations of a primary key, and optionally associations with other database components, such as association or foreign key relationships with other database tables.

The artifact definition 1000 can optionally include specifications of one or more associations 1020. An association 1020 can define a relationship to another entity. An association 1020 can be processed during the use of the artifact definition 1000, such as being converted to a SQL expression such as a JOIN. Unlike other conditions or elements that are included in the artifact definition 1000, associations can define a relationship that can at least in some cases be optional, such as being selectively activated depending upon how the artifact definition is accessed. For example, an association 1020 can be converted to a JOIN condition that uses a table provided in a SELECT statement that references the artifact definition 1000.

The artifact definition 1000 can include one or more components 1022 that specify how data retrieved using the artifact definition should be processed, including to generate values that are associated with other metadata elements of the artifact definition. Processing can include calculating values, such as using a formula specified in, or referenced by, the artifact definition 1000. In particular, a processing component 1022 can specify that a particular field value should be treated as an element 1024, where an element can be as described in Examples 9 and 10. Thus, the artifact definition 1000 can include dependencies on how elements are defined, and the artifact definition 1000 may not be accurate, or useable, if the element definition does not match how it is used, and intended to be used, in the artifact definition 1000.

The artifact definition 1000 can optionally include additional components, such as one or more conditions 1028, or other operations, such as aggregations, unions, etc., including such operations that are typically supported by a database query language.

Example 12—Example Artifact Definition, Including Relationships with Other Artifact Definitions FIG. 11 illustrates how artifact definitions may have dependencies on other artifact definitions. In particular, FIG. 11 shows a view artifact definition 1104, which can be the artifact definition 1000 of FIG. 10. FIG. 11 also illustrates an artifact definition 1108 for an access control object (such as a DCLS, or data control language source), an artifact definition 1112 for a metadata extension object (such as a DDLX, or metadata extension), and an artifact definition 1116 for an extension element object (such as a DDLS, or data definition language source).

The access control object artifact definition 1108 can be used for restricting access to data that can be retrieved using the view artifact definition 1104. For example, the view artifact definition 1104 and the access control object artifact definition 1108 can be processed together when the view artifact definition 1104 is activated, such as to generate SQL commands that retrieve data for the view artifact definition, but which are filtered or restricted based on the access control object artifact definition. As the access control object artifact definition 1108 references the view artifact definition 1104, the access control object artifact definition depends on the view existing, and on the view containing elements specified in the access control object artifact definition. For example, the access control object artifact definition references the "SalesOrderType" element of the view "I_SampleSalesOrder" and the authorization object "V_VBAK_AAT" with its authorization field "AUART". Thus, the first element would be undefined or unusable if the corresponding element did not exist in the view artifact definition 1104.

The metadata extension object artifact definition 1112 (which adds annotations to the view artifact definition 1104) has similar dependencies on the view artifact definition, as does the extension element object artifact definition 1116 (which adds additional elements to the view artifact definition).

Example 13 Example Relational Model of Artifact Definitions

Figure 12:
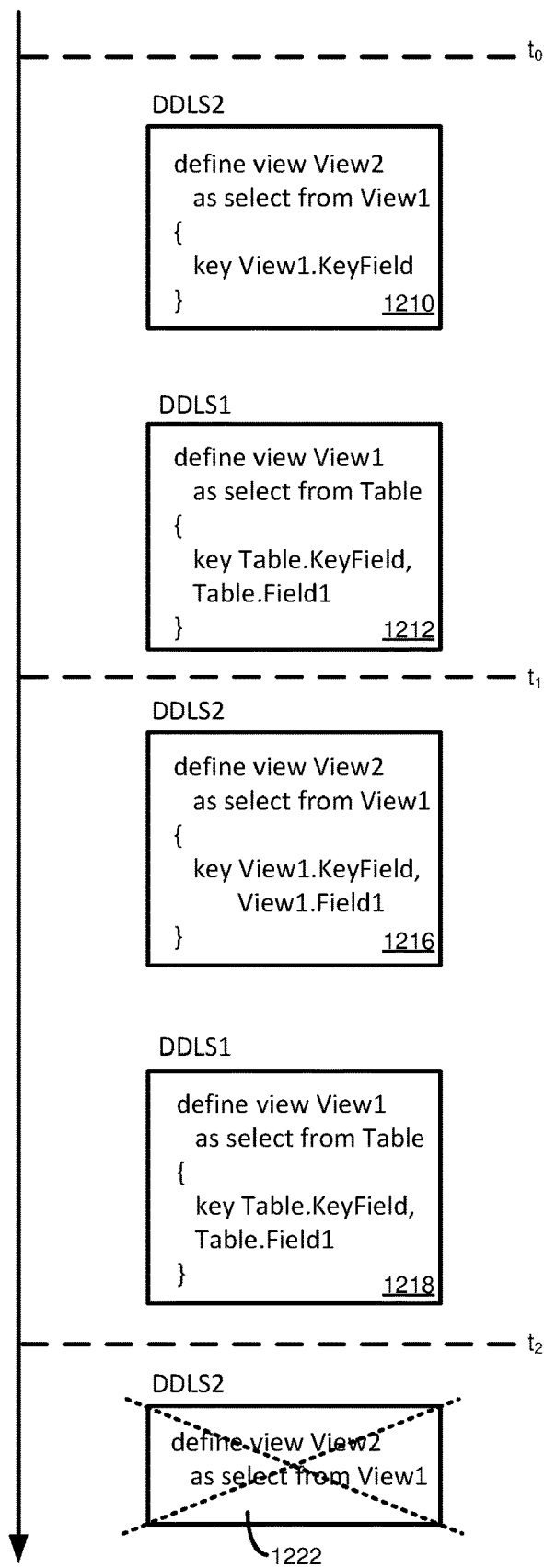
FIG. 12 is a schematic diagram illustrating how artifact definitions can be interrelated, and updated or deleted, including by multiple computing systems.

FIG. 12 illustrates how artifact definitions may be dependent on one another, and can be changed over time, which can affect the use or validity of dependent artifact definitions. At time $t_0$, data definition language versions of artifact definitions are provided. The artifact definitions are for two database objects, a model 1210 for a View1 and a model 1212 for a View2. The model 1212 for View2 references View1, as it contains a SQL select statement that defines a particular subset of data defined by the model 1210 for View 1. Thus, the model 1210 includes a dependency on the model 1212. In particular, the model 1210 depends on View1 existing, and there being a field "KeyField" in View 1.

At time $t_1$, a model 1216 for a second version of View2 is received. Compared with the model 1212, the model 1216 includes another field, Field1, of View1, in the definition of View2. In some cases, the model 1216 can be provided as a complete model, while in other cases only changes compared with a prior model version are sent.

At a time $t_2$, the second system uploads an indication 1222 that View2 was deleted. Note that, in this case, the deletion of View2 does not affect any described artifact definition, as View2 depended on View1, but View1 did not depend on View2. If, instead, View1 had been deleted at time $t_2$, it could be determined that deleting View1 would create issues with View2.

Figure 13A:
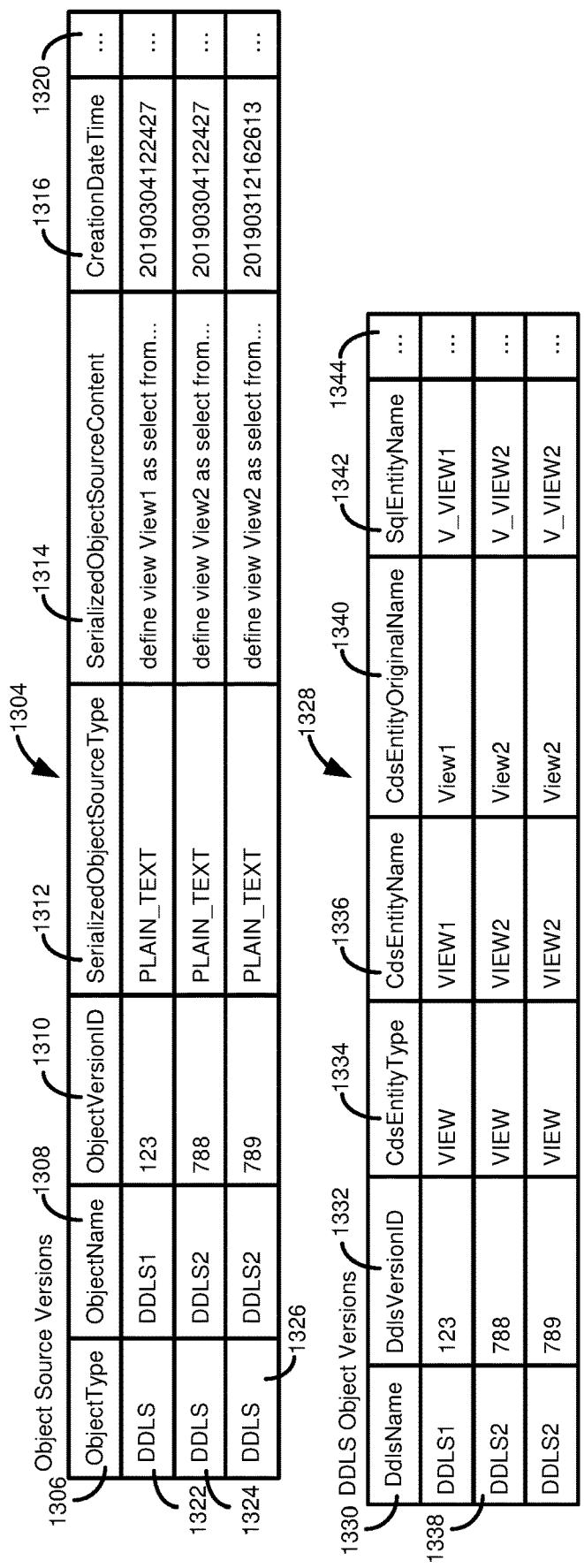

FIG. 12 illustrates the artifact definitions as defined in a first format, such as a SQL statement defining the views. FIGS. 13A and 13B illustrates how the artifact definitions shown in FIG. 12 can be converted to a different format, such records in a collection of database tables used to store representations of artifact definitions. In particular, FIG. 13A shows a table 1304 that includes a field 1306 for an object type associated with a record of the table, a field 1308 holding a name of the object, a field 1310 holding a version identifier associated with the object, a field 1312 providing a type associated with an original format in which the corresponding artifact definition was received (e.g., plain text, JSON, XML, CSN, etc.), a field 1314 holding a listing of the original source content (in the type associated with the field 1312), and a field 1316 that includes a timestamp of when the object was received (e.g., with reference to FIG. 11, a timestamp associated with time $t_0$, $t_1$, or $t_2$). The table 1304 can optionally include one or more additional fields 1320.

It can be seen that the table 1304 includes a record 1322 for View1, received at to, a record 1324 for the artifact definition of View2 received at $t_0$, and a record 1326 for the artifact definition of View2 received at $t_1$. Note that table 1304 can include information for object source versions, and so type, name, and version information (i.e., fields 1306, 1308, 1310) can be specific for the object as an object source (e.g., a data definition language source, or DDLS).

A table 1328 can include fields for data definition language object versions, which can include a field 1330 for a DDLS name and a field 1332 for a DDLS version identifier, which fields can correspond to the fields 1308, 1310 of the table 1304. The table 1328 can further include a field 1334 that describes an entity (e.g., artifact definition) type associated with the corresponding artifact definition. Examples of entity types can be table, view, access control, annotation extension, metadata extension, etc.

A field 1336 can include an entity name or identifier, which can be a name or identifier assigned to the artifact definition in the declaration of the artifact definition, such as in the SQL statements shown in FIG. 12. For example, FIG. 12 shows artifact definition 1010 as defining a VIEW1, which then supplies the type indicated in field 1334, and the name entered in field 1336 indicated for a record 1338. Note that field 1336 can be a canonical form of the name of the artifact definition, and the original name, supplied in the artifact definition, can be included in a field 1340. Similarly, the canonical name of field 1336 can be associated with other formats, such as a format provided in a field 1342, which, as shown, can be a name used in SQL queries for the artifact definition, which can correspond to a name of the artifact definition used in a database layer, such as in an information schema. The table 1328 can include one or more additional fields 1344.

As shown in FIG. 13A, all of the information for the artifact definitions provided at $t_0$ and $t_1$ in FIG. 12 can be retrieved from the tables 1304, 1328, either from individual fields or from the field 1314 with the original source content. FIG. 13B illustrates tables 1350, 1352, 1354, 1356, which can store additional information about the artifact definitions, including about the systems from which the artifact definitions, or updates (including deletions) were received. In particular, table 1350 can be used to associate artifact definitions with software component version identifiers, which can be used to describe the operating environment on the system from which the artifact definition was received. Table 1350 includes a field 1360 for the software component version ID associated with the artifact definition object name listed in field 1364 (and which corresponds to the field 1308 of table 1304) and the version identifier of field 1366 (which corresponds to the field 1310 of table 1304). A type for the object can be specified in a field 1362.

When an artifact definition is changed, the version associated with the identifier in the field 1366 can be linked to a prior version of the artifact definition, which can be stored in a field 1368. In the case of an artifact definition deletion, a deletion time can be listed in a field 1370 (where no value, or a NULL value, can indicate that the object has not been deleted). In some cases, the deletion field 1370 can be filled out for all versions of the data model. In other cases, the deletion field 1370 is only populated for the last version of the artifact definition prior to the deletion.

The table 1352 can associate particular software components, listed in field 1372 (and corresponding to field 1360) with specific system software versions listed in a field 1374. In turn, table 1354 can associate the specific software system versions, in a field 1376, with specific systems indicated by a system identifier in a field 1378, and a timestamp in field 1380 indicating when the system was installed, released, or activated. The table 1356 can include a field 1382 for particular software component versions, corresponding to field 1360 with an identifier of the software component provided in field 1384, a release identifier in field 1386, and a support package identifier in a field 1388. Each of the tables 1350, 1352, 1354, 1356 can optionally include one or more additional fields 1390.

Figure 14:
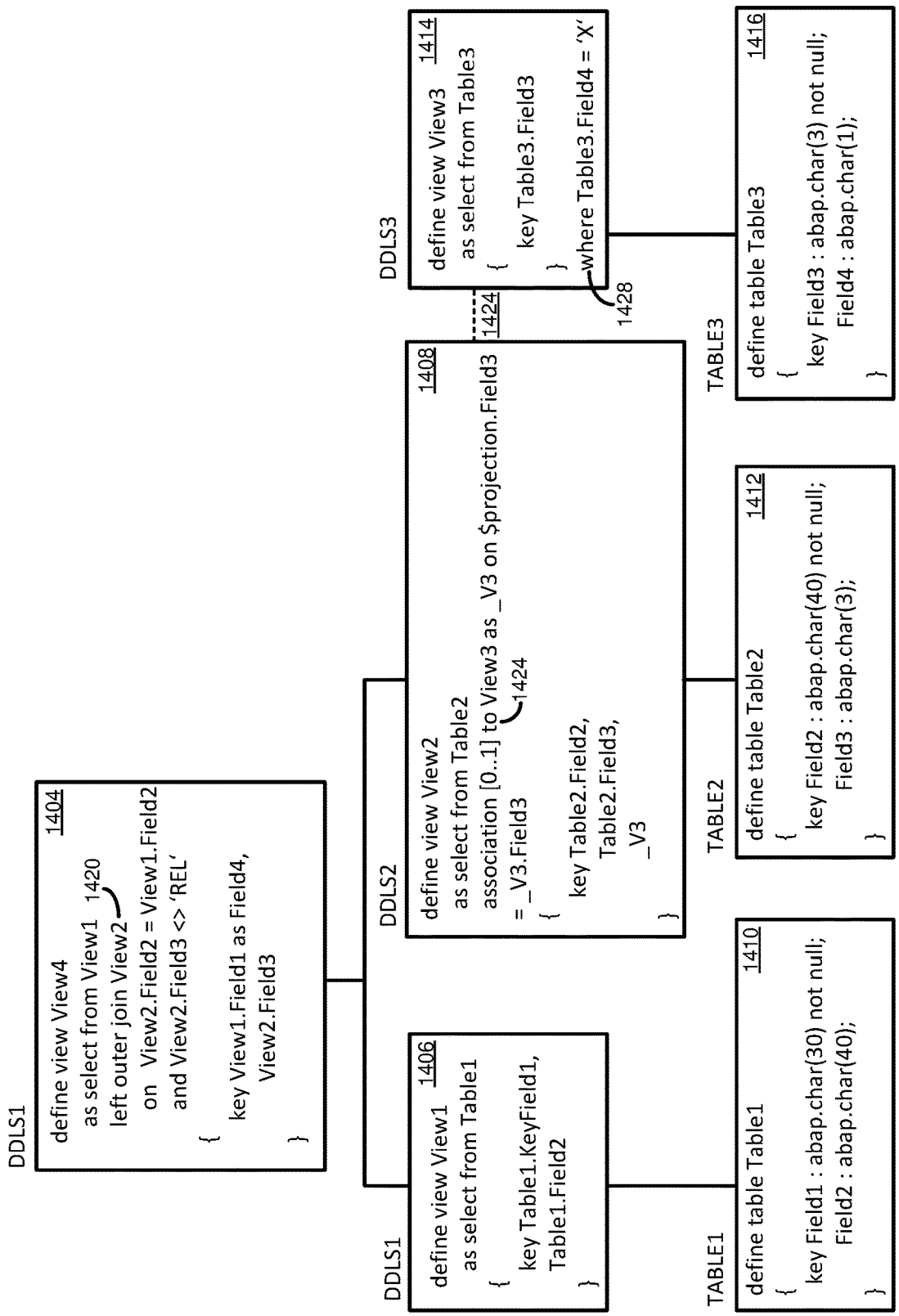
FIG. 14 is a schematic diagram illustrating how artifact definitions can be interrelated, and can include query operations, such as select statements, join conditions, and where conditions, and how database objects can be related by associations.

Example 14—Example Metadata Relational Model, Including Query Language Operations FIG. 14 illustrates a scenario where an artifact definition 1404, in particular, a view, is defined with reference to two view artifact definitions 1406, 1408, which can in turn depend on one or more additional data models. The artifact definition 1406 depends from an artifact definition 1410 for a table, while the artifact definition 1408 depends from an artifact definition 1412 for a table, and has an association with an artifact definition 1414 for another view, which in turn references an artifact definition 1416 for a table. These dependencies can be evaluated as described for a scoping function and a traversal component for identifying database artifacts and associated metadata for one or more specified artifacts (including artifacts that are responsive to a particular search/query request).

The view artifact definitions 1404, 1406, 1408, 1414 include SQL select statements that can be stored in an alternative format, such as in tabular form, as shown in FIG. 14. The select statements of the view artifact definitions 1404, 1406, 1408, 1414 of FIG. 14 can include additional features/operations that can be stored in an alternative representation, such as a join condition 1420 in the artifact definition 1404, an association 1424 between the artifact definition 1408 and the artifact definition 1414, and a where condition 1428 in the artifact definition 1414.

FIG. 15 illustrates a table 1504 that can store information for artifact definitions having select statements in tabular format. Table 1504 includes a field 1508 for an object type, which for the artifact definitions 1304, 1306, 1308, 1314 is a data definition language source object. A field 1510 includes a name or identifier for each record, which can be a system assigned name, or a name used for system purposes, for a given object, such as to uniquely identify each object.

Note that the SQL statements in FIG. 14 do not assign the name used in the field 1510. A field 1512 can store an object version identifier value for the object associated with each record. In some cases, the value stored in the field 1512 can be unique to the given object, and can be incremented when a change is made to the object. For example, record 1516 is shown as having an object version identifier of 56 for the DDLS1 object. If the DDLS1 object is changed again, the object version identifier can be incremented to 57.

The table 1504 can include a field 1520 that stores an entity name, which can be an entity name used in the SQL statements shown in FIG. 14. For example, the artifact definition 1404 defines a view View4, which is the name provided in the field 1520 for record 1522, corresponding to View4. In at least some cases, each object in the table 1504 can be associated with a primary data source. For example, a SQL statement can have the form "SELECT FROM primaryDataSource," where the identifier of "primaryDataSource" is stored in the field 1524. For artifact definition 1404, View4 is defined primarily with respect to View1, and so View1 is listed in field 1524 for record 1522. The primary data source of field 1524 can have a type, such as table or field, which type is provided in a field 1526.

As described, a select statement used in an artifact definition can have additional operations, which can be recorded in the table 1504. If an object artifact definition includes a where condition, an identifier for that condition can be included in a field 1528. Artifact definition 1414 includes where condition 1428, and so an identifier for that condition can be entered in the field 1528 for record 1522. The identifier in the field 1528 can identify a particular condition collection, where additional information can be included in a condition collection table 1532, as will be further described. Similarly, if an object artifact definition includes a join condition, an identifier for the condition can be included in a field 1536. The identifier in the field 1534 can identify a condition collection in the table 1532.

The table 1532 allows condition details associated with the select statements in table 1504 to be further detailed. The table 1532 includes an object type field 1538 and an object name field 1540, which can correspond to the fields 1508, 1510 of table 1504. Note that the join condition of artifact definition 1404 is represented by records 1544-1548, the "where" condition of artifact definition 1414 is represented by record 1550, and the "on" condition of the association of artifact definition 1408 is represented by record 1552.

The table 1532 includes a field 1556 for a version identifier of the object listed in the field 1540, and can correspond to the field 1512. A field 1558 includes condition collection identifiers, and can correspond to the fields 1528, 1536. A group ID field 1560 and a grouping ordinal number field 1562 can be used to preserve the semantics of the conditions as originally expressed (e.g., in SQL). For example, the group ID field 1560 can be used to indicate portions of a condition that are associated with a data source indicated in a field 1564. So, record 1544 is associated with a group identifier in field 1560 of 1, as it is associated with a value of VIEW1 in field 1564, while records 1546, 1548 are associated with a group identifier of 2, as both records are both associated with a value of VIEW2 for field 1564. The values of the grouping ordinal number field 1562 can further identify particular semantics for the records 1546, 1548, such as indicating that record 1546 precedes record 1548 in the original select statement. A grouping operator field 1566 can provide an operator that associates records associated with a particular group identifier value of the field 1560.

For a given operator or relation listed in a field 1568, fields 1570, 1564, 1572, 1574 can list a left group identifier, the left data source name, a left field name, and a left value, respectively. Similarly, fields 1576, 1578, 1580, 1582 can provide a right group identifier, a right group source name, a right field name, and a right value, respectively. "Left" and "right" refer to the position of the values with respect to the operator of the field 1568.

It can thus be seen that the records of the table 1532 can be used to reconstitute the operations or conditions of the artifact definitions in the format shown in FIG. 14. Although the table 1532 may not explicitly list a type of operation or condition, that information can be gathered from the fields 1528, 1536 of the table 1504 (or from the table 1584, as will be further described).

An association definition table 1584 can define associations included in artifact definitions, such as models provided in the format shown in FIG. 14, and can include an object type field 1586, an object name field 1587, an object version identifier field 1588, and an entity name field 1589, which can be as described for the fields 1508, 1510, 1512, 1520 of table 1504. A field 1590 can store a standardized version of an object identifier (e.g., an identifier of an object artifact definition) listed in a field 1592, which can be the object name as included in the association definition in the original artifact definition, such as the association 1424. A field 1594 can provide a name of the associated entity, and a type associated with the entity (e.g., table, view) can be provided in a field 1595. An association can be associated with a minimum cardinality and a maximum cardinality, fields 1596 and 1597, respectively. A field 1598 can include a condition collection identifier, which can correspond to the field 1558 of the table 1532.

Taking the example association 1424 of FIG. 14, the record 1552 sets forth the condition defined for the association (i.e., the "on" condition). For example, values in a FIELD3 of the table referenced by the view 1408 being defined being equal to a FIELD3 of the associated view defined in artifact definition 1414, which in turn are associated with the table defined in artifact definition 1416.

The tables 1504, 1532, 1584 can optionally include one or more additional fields 1599.

Example 15— Example Relational Artifact Definition, Including Field Definitions and Relations In some cases, a metadata object, such as a view, can include fields that are calculated or otherwise based at least in part on elements (e.g., fields) of one or more other artifact definitions. The calculations can be explicitly specified in the artifact definition, or can be referenced in the model definition, such as by calling in a built in function or referencing a function in another artifact definition, in a library, an API call, etc.

FIG. 16 illustrates an artifact definition 1604 that defines a view with reference to an artifact definition 1608, that in turn references a table defined by an artifact definition 1612. The artifact definition 1604 includes four fields, 1620, 1622, 1624, 1626 that are derived from fields in the artifact definition 1608. The artifact definition 1608 includes three fields 1630, 1632, 1634 that are selected from the table defined by the artifact definition 1612. The table defined by the artifact definition 1612 includes three fields 1640, 1642, 1644 that are declared/defined in that artifact definition.

FIG. 17 illustrates a table 1700 that can be used to summarize the fields used in the artifact definitions 1604, 1608, 1612. The table 1700 includes a field 1702 that indicates the type of object with which the field is associated, such as being associated with a table or a data definition language source object (e.g., a view). A name of the object is provided in a field 1704, which can be an object name used by, or supplied by, a system with which the artifact definition is used, or, for example, by a metadata repository A version identifier for the object can be provided in a field 1706, which, as discussed for other artifact definition representations, can be a unique number for each object, and can be incremented as the object is changed. An entity name field 1708 can include a name that is associated with the artifact definition, such as a name that is defined in the declaration of the artifact definition.

Each metadata object can be associated with one or more fields, and a field 1710 can store a standardized representation of a field name provided in a field 1712. For example, the field 1710 can store a name that removes formatting/capitalization (e.g., lower case letters) from the field name listed in the field 1712. As described, artifact definitions may incorporate fields from other artifact definitions. The immediate source of the field can have a name, provided in a field 1714, and can have a type, such as a table or view, and this type can be provided in a field 1716. The name of the field in the immediate source can be different than the name of the field in the artifact definition into which it is incorporated, so a field 1718 can include the name of the field in the source artifact definition.

Calculated fields can be associated with an expression, and an identifier for the expression can be provided in a field 1720, which can be used to access the expression, such as an expression stored as a representation in one or more other tables. A field 1722 can indicate whether the field is a key field (e.g., a field used in a primary key). Fields can be associated with a data type, which can be listed in a field 1726, and a data type can be associated with additional semantic or technical information, such as in a data element, an identifier for which can be provided in a field 1724. Often, a data type associated with a field 1726 (and in turn with the field 1724) can have a length, such as number of digits or characters that are allowed, and this information can be included in a field 1728.

Numerical fields that allow for the use of decimals can be associated with a value (e.g., a number of decimal places allowed) through a field 1730. Fields 1732, 1734, 1736, 1738 can be used to define where in a source artifact definition a definition of the expression appears, such as a start line, start column, end line, and end column, respectively. The table 1700 can optionally include one or more additional fields 1740.

As an example of how the table 1704 can be used to represent fields from the artifact definitions of FIG. 16, consider record 1750, associated with the artifact definition 1608. Artifact definition 1608 is for a view, VIEW1, and references a Field1 of Table1 (defined by the artifact definition 1612), which is a key field. Record 1752 corresponds to the definition of Field1 of Table1 in the artifact definition 1612, where Field1 is defined as a key field, that has data element type DE1, and may not be a null value. Record 1750 includes the name of the object, VIEW1, in field 1708, the name, FIELD1, of the field in the object in field 1710, the original name, Field1, of the field in the object in field 1714, the name of the entity where the field is referenced from, TABLE1, in field 1716, the type of the referenced entity, TABL (for table) in field 1716, and the name of the field, FIELD1, in the referenced entity in field 1718. Field 1722 of record 1750 is set to TRUE, indicating that the field associated with record 1750 is a key field, while field 1724 specifies that the field has a data element type of DE1, which fields 1726 and 1728 indicate is a character data type of length 30.

Example 16—Example Relational Artifact Definition, Including Annotations

Figure 18:
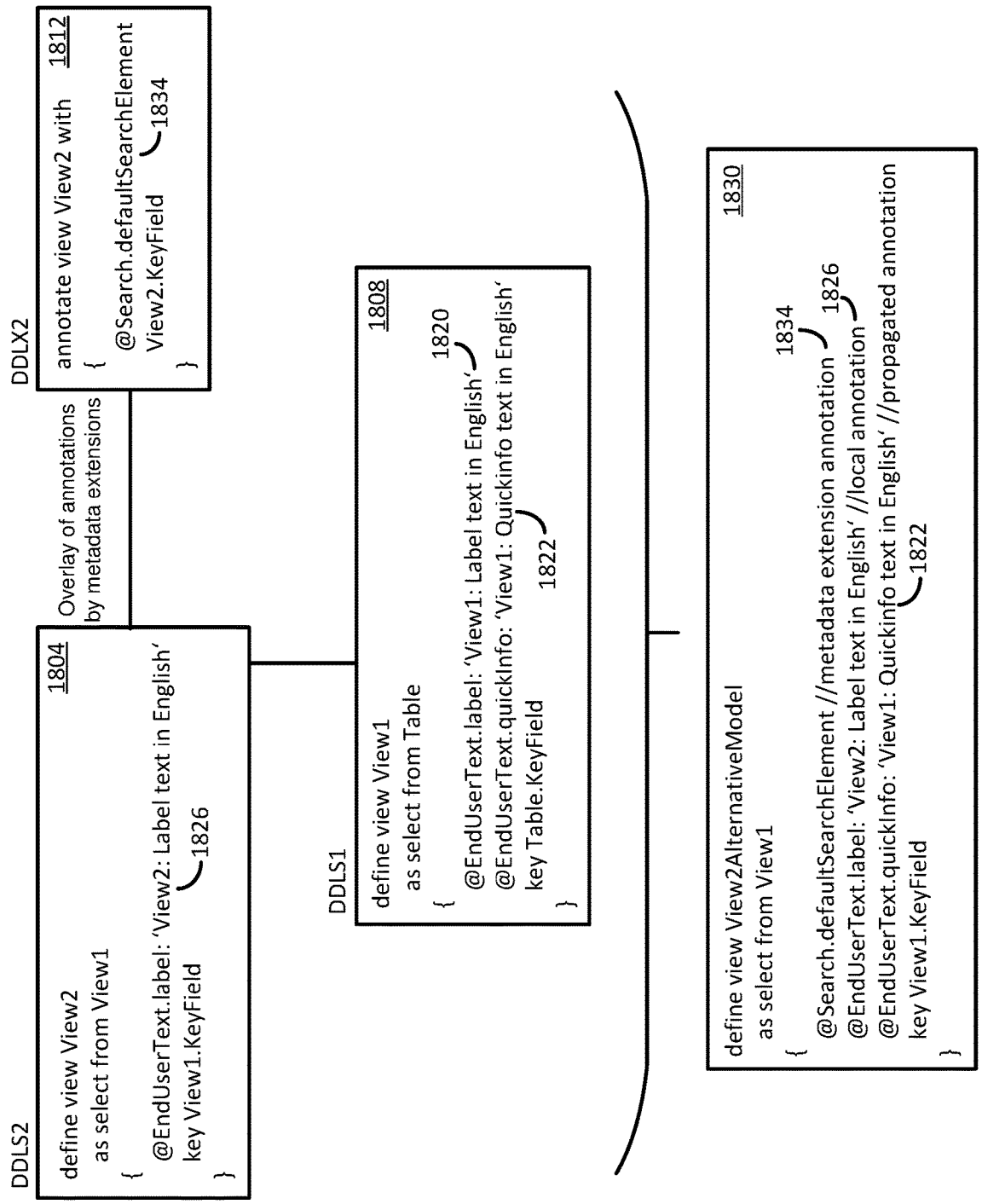
FIG. 18 is a schematic diagram illustrating how artifact definitions can be related, including artifact definitions having annotations and artifact definitions that annotate other artifact definitions.
Figure 19:
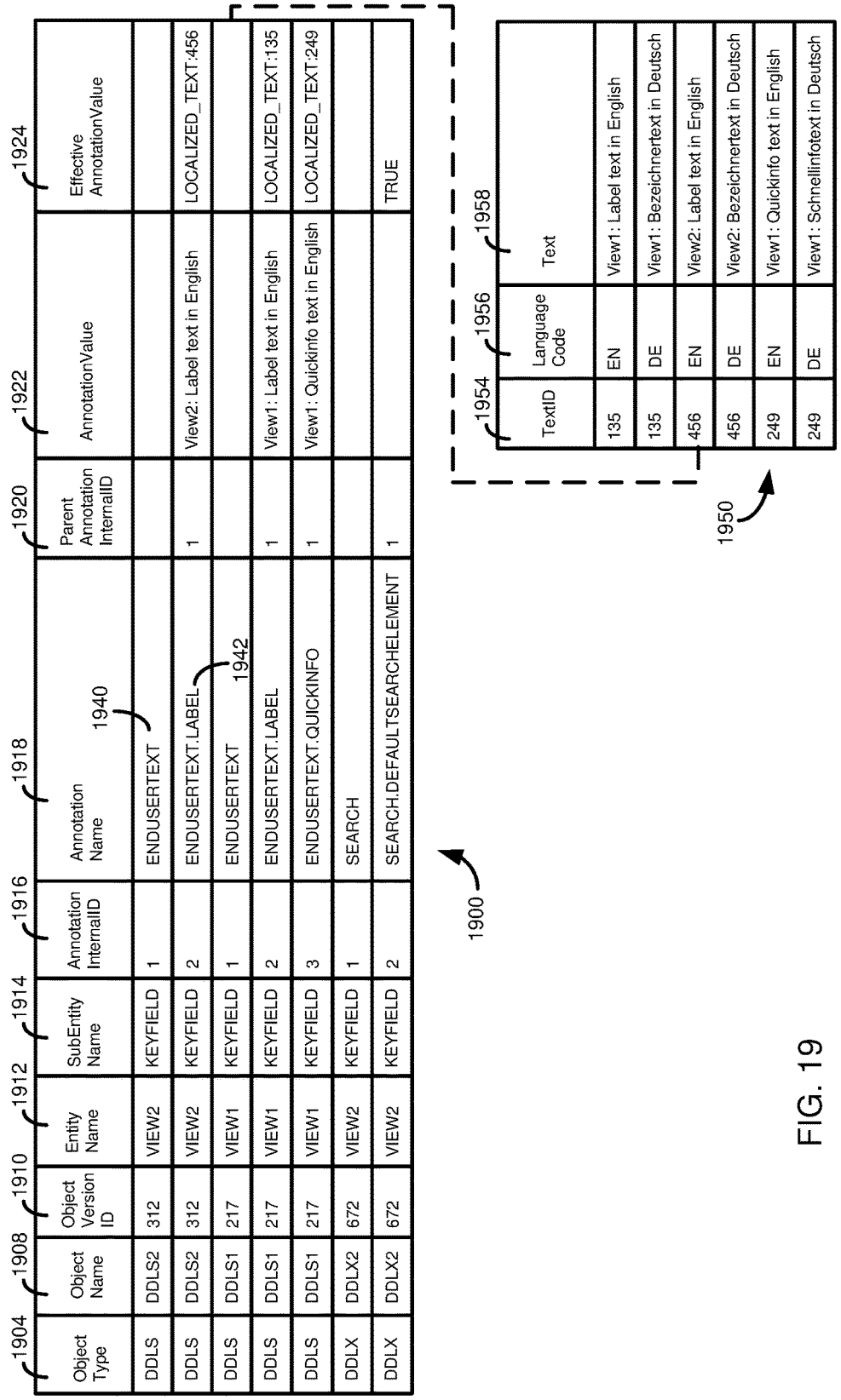
FIGS. 19 and 20 provide example database tables illustrating how artifact definition information presented in FIG. 18 can be stored in a relational format.

As described in Example 11, a metadata object, such as a view definition, can include annotations. FIG. 18 illustrates how metadata objects, which can have dependencies on one another, can have annotations, which can be stored in another format, such as the format shown in the table 1900 of FIG. 19.

FIG. 18 includes an artifact definition 1804 for a view, View2, which is defined with respect to another view, View1, defined in artifact definition 1808. An artifact definition 1812 for a metadata extension, DDLX2, provides additional metadata elements for the artifact definition 1804. The artifact definition 1808 includes two annotations, 1820, 1822 that may be incorporated into the artifact definition 1804. However, the annotation 1820, which provides a label for View1, is superseded by an annotation 1826 defined in the artifact definition 1804 for View2. An annotation can be superseded, in some cases, if the annotation has the same name or type (e.g., "@EndUserText.label" as shown) in the referencing artifact definition as in the referenced artifact definition.

Artifact definition 1830 illustrates an "effective" representation of the artifact definition 1804, including annotations incorporated into the artifact definition 1804 by dependency. It can be seen that the effective artifact definition 1830 includes the annotation 1826, but not the annotation 1820. As the annotation 1822 for the artifact definition 1808 is not superseded, it is included in the effective artifact definition 1830, as is an annotation 1834 from the artifact definition 1812.

The table 1900 can summarize the annotations of the artifact definitions of FIG. 18. The table 1900 includes a field 1904 for an object type associated with the artifact definition which is annotated by a record representing an annotation. As shown, the field 1904 includes values of "DDLS" for views, or "DDLX" for metadata extension objects. A field 1908 can provide a name of the object, such as a system name, while a field 1912 can provide an object name defined by the declaration of the object. A field 1910 can provide a version identifier for the object. A field 1914 can provide a name of a subentity associated with an annotation, which can be, for example, a particular view field to which an annotation applies.

A field 1916 can provide an annotation internal identifier, which can be used to distinguish between multiple annotations for an artifact definition, and can be used to provide an ordering of annotations when multiple annotations are present in an artifact definition. A value of the field 1916 can also be used to correlate a base or parent annotation or annotation type with a sub-annotation, as will be further described. An annotation name can be included in a field 1918, which can be a type (or class) or subtype (or class method or class data member) of an annotation. A field 1920 can provide an identifier for a parent annotation. For example, record 1940 assigned an annotation internal identifier of "1" to the "ENDUSERTEXT" annotation. "ENDUSERTEXT" can be a base annotation type, and record 1942 can include the subtype of the annotation, "ENDUSERTEXT.LABEL," where the value of "1" in field 1920 indicates that the record 1942 refers to the annotation of record 1940.

A value of the annotation as defined in the declaration of the artifact definition can be provided in a field 1922. The value in the field 1922 represents the explicitly defined value assigned to the annotation. An effective value assigned to the annotation can be indicated in a field 1924. For example, the annotation @Search.defaultSearchElement has the effective value "TRUE" even though this is not explicitly captured in the declaration of the artifact definition but automatically derived from the annotation defaulting logic. Furthermore, in the example shown, the effective value for language dependent texts can be specified with respect to an identifier in a table 1950, where the value in the field 1924 corresponds to a value in a text identifier field 1954. The table 1950 is also shown as including a field 1956 that provides a code for a language associated with the text, and the actual text to be displayed can be provided in a field 1958.

Figure 20:
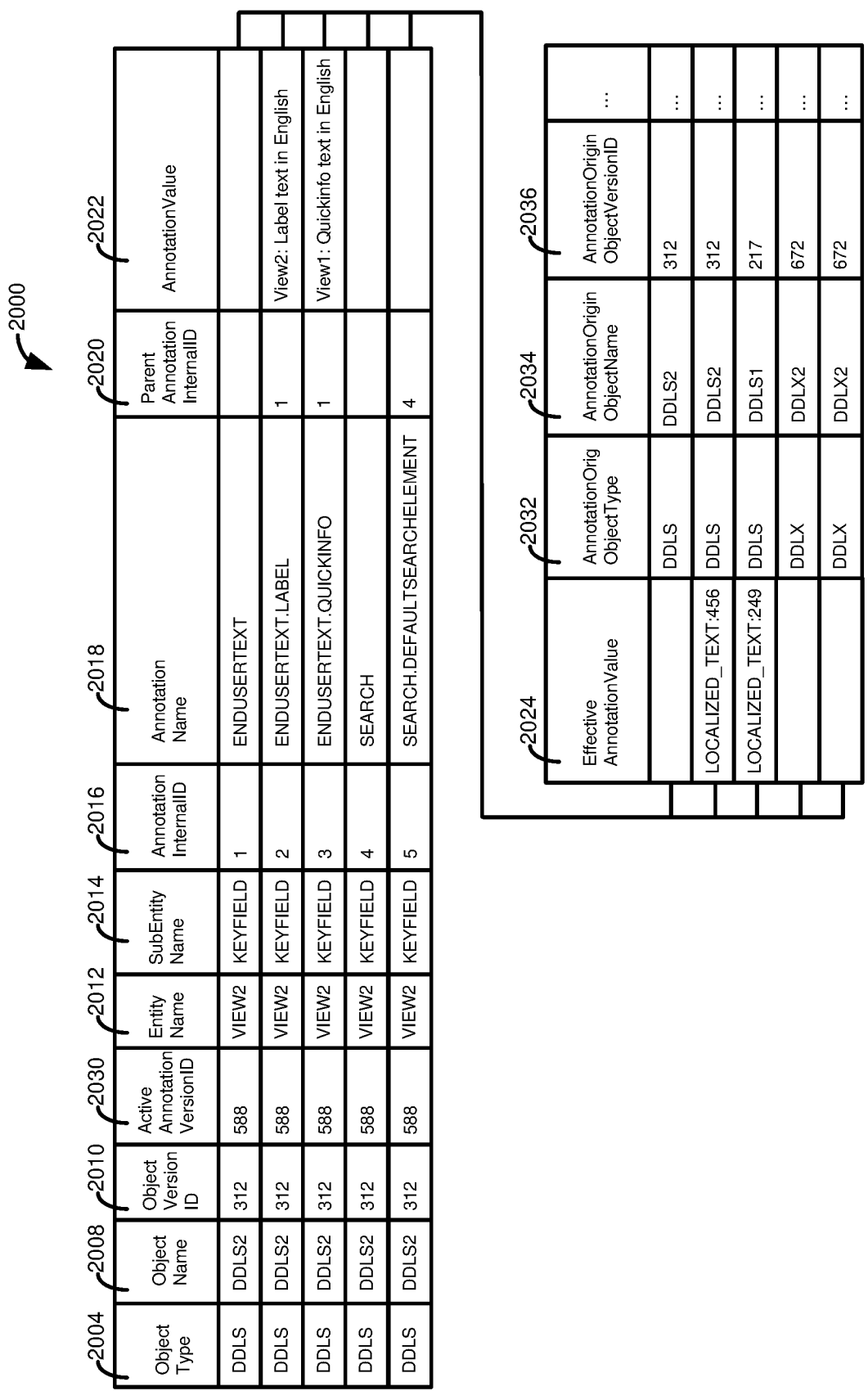

The table 1900 can store information for all annotations that are incorporated into a particular artifact definition. However, as described, some of the annotations may not be "active," in that, for instance, a locally declared annotation may overwrite an imported or referenced annotation. Similarly, in some cases annotations from multiple referenced sources (e.g., artifact definitions) may overlap or conflict, in which case only one (or, generally, a subset) of the annotations may be designated as active. It can be beneficial to separately maintain a repository of active annotations, which can be stored as shown in the table 2000 of FIG. 20.

The table 2000 can include a field 2004 for an object type, a field 2008 for an object name, a field 2010 for an object version identifier, a field 2012 for an entity name, a field 2014 for a subentity name, a field 2016 for an annotation internal identifier, a field 2018 for an annotation name, a field 2020 for a parent annotation identifier, a field 2022 for an annotation value, and a field 2024 for an effective annotation value, which fields can be implemented at least generally as described for the similarly titled and numbered fields of the table 1900.

The table 2000 can include additional fields, such as an active annotation version identifier field 2030. Note that the active annotation version identifier in the field 2030 can have a value that is different than the object version identifier in the field 2010. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., artifact definition). Accordingly, a field 2032 can store the object type associated with the annotation (either the local object type or the object type of the object from which the annotation is being imported), while a field 2034 can store the name of the originating object. A field 2036 can store the version identifier of the originating object.

Example 17—Example API for Metadata Access

Users or applications can access stored artifact definitions, such as metadata maintained in one or more of the tabular formats described in Examples 12-15. In some cases, the information can be accessed via an API, such as a web-based API using REST services. In a particular example, the API can use the OData protocol.

Figure 21:
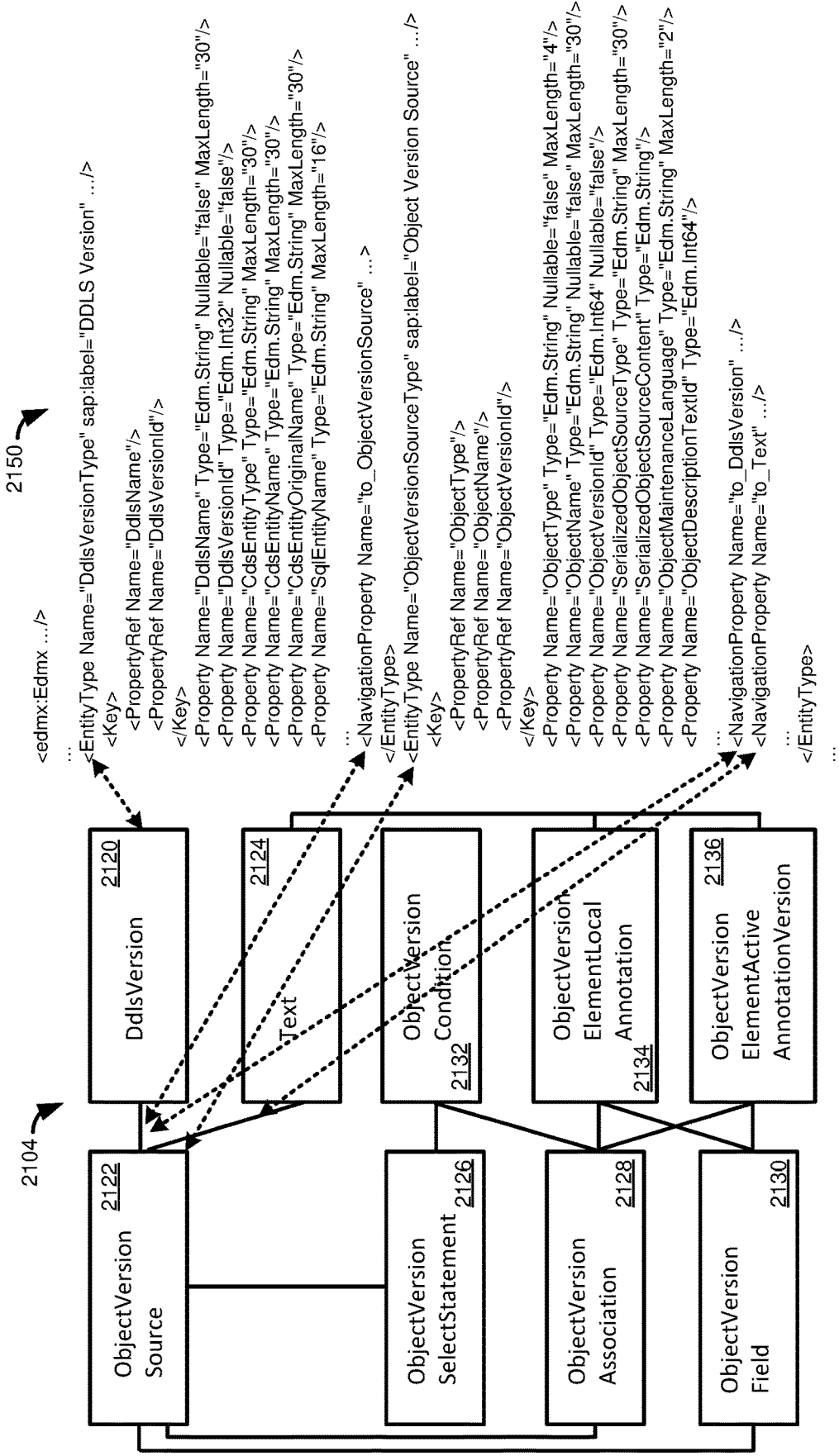
FIG. 21 illustrates code for a data access service that can access a persistency model for artifact definitions.

FIG. 21 illustrates an extract 2104 of a persistency model (e.g., all or a portion of the tables of Examples 13-16) and an extract 2150 of an OData service that can be used to access data maintained in the persistency, or determined or calculated from data in the persistency. The persistency extract 2104 can include tables, or portions thereof (e.g., one or more fields), for DDLS version information 2120, object version source information 2122, textual information 2124 (e.g., text of original metadata object definition information), select statement information 2126 associated with object versions, association information 2128 associated with object versions, field information 2130 associated with object versions, condition information 2132 associated with object versions (e.g., "where" or "on" conditions, such as described with respect to table 1432), local annotation information 2134 associated with object versions, and active annotation information 2136 associated with object versions.

An API, or other functionality for accessing services of a metadata service, can provide functionality for, among other things, querying and maintaining representations of artifact definitions, such as to create, update, or delete artifact definition representations (or specific versions thereof). The API can allow for other options, such as aggregating data from persisted artifact definition representations or searching a metadata repository, including using fuzzy search techniques. For example, a user (or an application) might request information regarding how many objects are registered in a repository, how many versions are associated with a particular object, or a number of fields, such as a maximum number of fields, that an object may have.

FIG. 22 illustrates an example table 2204 having objection version source information, and an example table 2208 having DDLS version information. The table 2204 can have multiple fields, including a field 2212 for an object type associated with a record, a field 2214 for an object name associated with a record, and a field 2216 for an object version identifier associated with a record. The table 2208 can have a field 2220 for a DDLS name, a DDLS version field 2222, an entity name (such as a CDS entity name) field 2224, and an original entity name field (such as an original CDS entity name) field 2226.

Taking the metadata representations of tables 2204 and 2208 and using the extract 2050, a navigation property of the extract can be traversed to the DDLS version table 2208 from a record of the object version source table 2204 by an OData read request like:

```
.../sap/opu/odata/sap/CdsMetadataService/ObjectVersionSource(ObjectType='DDLS',Object
Name='I_SALESORDER',ObjectVersionId=1)/to_DdlsVersion
```

The operation results in the related data record:

```
<?xml version="1.0" encoding="UTF-8"?> ...
<id>.../sap/opu/odata/sap/CdsMetadataService/DdlsVersion(DdlsName='I_SALESORDER',
DdlsVersionId=1)</id> ...
<content type="application/xml">
   <m:properties>
      <d:DdlsName>I_SALESORDER</d:DdlsName>
      <d:DdlsVersionId>1</d:DdlsVersionId>
      ...
   </m:properties>
</content> ...
      The API can allow all related information for a given object version to be searched.
For example, a search request for "cust" can have the form:
.../sap/opu/odata/sap/CdsMetadataService/Ddls/?search=cust
```

Which retrieves all five records having the DDLS object name (e.g., field 2214) as I_CUSTOMER. Note that a user can retrieve and access metadata information without knowing the exact name of an artifact definition or any of its constituent elements.

An API, or other metadata service access functionality, can support other services, including services based on more coarse granular actions than just simply retrieving and updating artifact definitions. These services can include uploading object source information, comparing artifact definitions (and parts thereof), including comparing artifact definitions between different components or system versions. Analysis can be provided of where various artifact definitions, or elements, are used, including identifying dependencies between artifact definitions/artifact definition components. Providing such services can be more efficient, and less error prone, than achieving the functionality every time through the application of multiple lower level functions.

As an example, for a request to upload an artifact definition, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:

ObjectType
ObjectName
SerializedObjectSourceType
SerializedObjectSourceContent
ObjectMaintenanceLanguage
ObjectLastChangedDateTime
SoftwareComponentId
SoftwareComponentReleaseId A metadata repository can be queried to determine whether a new version of the artifact definition needs to be created, and, if so, can convert the uploaded model to a persistency format used by the metadata service. In at least some cases, it can be determined whether any artifact definitions depend on the updated model and, if so, such dependent models can be updated to provide new model versions.

For a function that compares two artifact definitions, including two versions of an artifact definition, information can be provided as to differences between the objects, how artifact definitions differ between different versions of a software component, or how artifact definitions differ between two versions of a system. Example input for comparing two versions of an artifact definition can include:

ObjectType
ObjectName
ObjectVersion1Id
ObjectVersion2Id
ChangeTypes [e.g., change types to be queries, such as all, insert, update, delete, unchanged]
ComparisionScope [e.g., all elements of an artifact definition, or only specified elements or sets of elements]

The comparison can return information including:
ObjectVersion
ChangeType
SubObjectType [e.g., field, association, parameter]
SubObjectName
PropertyType [e.g., active annotation, key, data type, name]
PropertyName
PropertyValue The following can represent information in a request for changes in an artifact definition:

Input:
ChangeTypes=INSERT
ComparisonScope=ALL

The response can include:
Output:
ObjectVersion=2
ChangeType=INSERT
SubObjectType=FIELD
SubObjectName=NewField
Thus, the comparison request reveals that a new field, NewField, was introduced in object version 2 of the artifact definition.

An artifact exposure service or other functionality for accessing a metadata repository can be to return a list of objects where a particular metadata element is used. For example, a field may be initially defined for a particular table, but then may be referenced by multiple views. Input for this functionality can include:
Input:
ObjectType: Identification
ObjectName: Identification
ObjectVersionId: Identification
UseageTypes [e.g., ALL, association, target, data source, annotation)
MaximumNumberOfIndirections
The output of the request can include:
UsingObjectType
UsingObjectName
UsingObjectVersionId
UsageType
DirectlyUsedObjectType
DirectlyUsedObjectName
DirectlyUsedObjectName
DirectlyUsedObjectVersionId
NumberOfIndirections FIG. 23 provides an example of a "where used" request. A group 2304 of related artifact definitions includes an artifact definition 2308 for a View3 that references an artifact definition 2310 for a View2, which in turn references an artifact definition 2312 for a View1, which in turn references an artifact definition 2314 for a Table1. Assuming that each of the views, 2308, 2310, 2312 references a field of Table1, and that the views refer to this field through their referenced views as shown, a request could be:
Input:
ObjectName: TABLE1
UseageTypes: ALL
MaximumNumberOfIndirections: 5
In response to the request, the information shown in table 2330 could be provided, either in tabular form as shown, or in another format.

For a dependency check, input (e.g., arguments to the function) can include:
ObjectType
ObjectName
ObjectSourceType
ObjectSourceContent
SoftwareComponentVersions
NewSoftwareComponentVersions
A response to the request (e.g., values returned by the function, such as in a structure (e.g., a C++ struct) or class instance, or another complex or abstract data type), can include:
MessageType [e.g, INFO, WARNING, ERROR]
MessageText
EntityReference [e.g., a link to additional details for the artifact definition, so that additional information regarding dependent objects can be identified]

As a particular example, consider that a new annotation, NewAnnotation, is added to a field ViewField, which is exposed by a user model. Output for a dependency check can include:
MessageType: INFO
MessageText: A new annotation NewAnnotation was added to the field ViewField EntityReference= . . . /sap/opu/odata/sap/CdsMetadataService/ . . . NewAnnotation . . .

A service processing access to metadata can cause, or assist, in displaying metadata information to an end user, such on a user interface screen. The service can augment model metadata with additional information that can define the layout of the user interface, and can include or define additional services that allow a user to interact with the data. For example, annotations can be provided that assist a user in providing filter criteria via a value help, as shown in the example code of FIG. 24.

Example 18—Computing Systems

Figure 25:
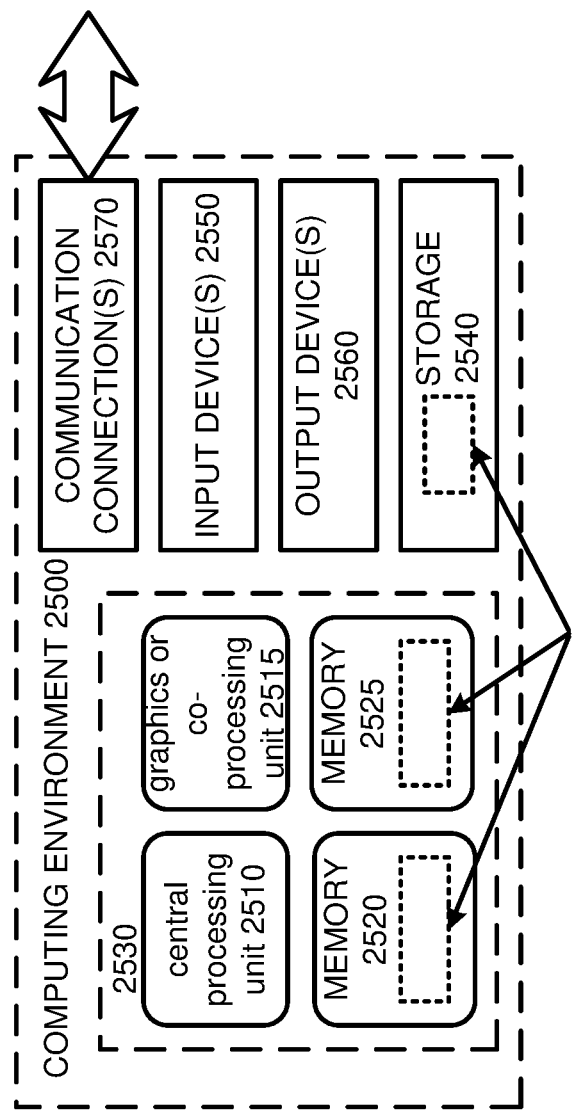
FIG. 25 is a diagram of an example computing system in which some described embodiments can be implemented.

FIG. 25 depicts a generalized example of a suitable computing system 2500 in which the described innovations may be implemented. The computing system 2500 is not intended to suggest any limitation as to scope of use or functionality of the present disclosure, as the innovations may be implemented in diverse general-purpose or special-purpose computing systems.

With reference to FIG. 25, the computing system 2500 includes one or more processing units 2510, 2515 and memory 2520, 2525. In FIG. 25, this basic configuration 2530 is included within a dashed line. The processing units 2510, 2515 execute computer-executable instructions, such as for implementing components of the environment 200 of FIG. 2 or the user interface screens of FIG. 4, including as described in Examples 1-17. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 25 shows a central processing unit 2510 as well as a graphics processing unit or co-processing unit 2515. The tangible memory 2520, 2525 may be volatile memory (e.g., registers, cache, RAM), non-volatile memory (e.g., ROM, EEPROM, flash memory, etc.), or some combination of the two, accessible by the processing unit(s) 2510, 2515. The memory 2520, 2525 stores software 2580 implementing one or more innovations described herein, in the form of computer-executable instructions suitable for execution by the processing unit(s) 2510, 2515.

A computing system 2500 may have additional features. For example, the computing system 2500 includes storage 2540, one or more input devices 2550, one or more output devices 2560, and one or more communication connections 2570. An interconnection mechanism (not shown) such as a bus, controller, or network interconnects the components of the computing system 2500. Typically, operating system software (not shown) provides an operating environment for other software executing in the computing system 2500, and coordinates activities of the components of the computing system 2500.

The tangible storage 2540 may be removable or non-removable, and includes magnetic disks, magnetic tapes or cassettes, CD-ROMs, DVDs, or any other medium which can be used to store information in a non-transitory way and which can be accessed within the computing system 2500. The storage 2540 stores instructions for the software 2580 implementing one or more innovations described herein.

The input device(s) 2550 may be a touch input device such as a keyboard, mouse, pen, or trackball, a voice input device, a scanning device, or another device that provides input to the computing system 2500. The output device(s) 2560 may be a display, printer, speaker, CD-writer, or another device that provides output from the computing system 2500.

The communication connection(s) 2570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 19—Cloud Computing Environment

Figure 26:
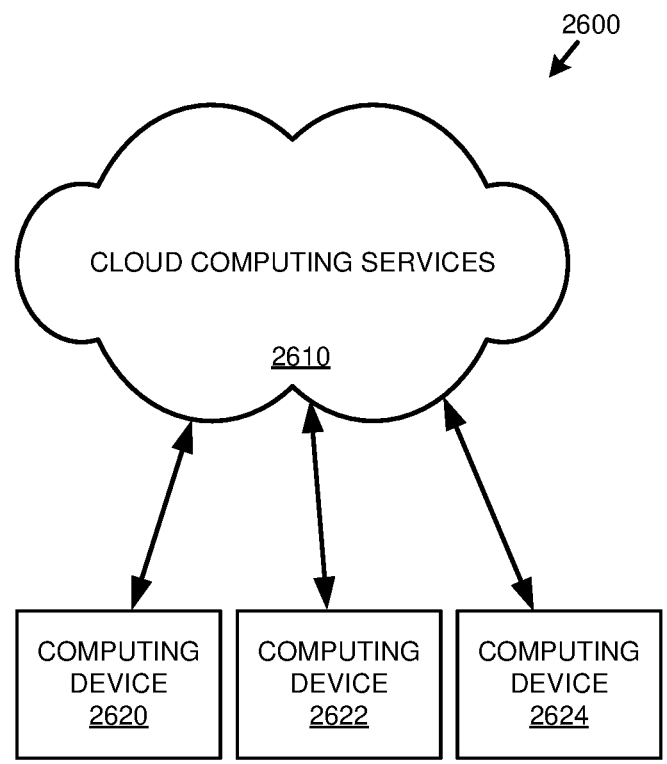
FIG. 26 is an example cloud computing environment that can be used in conjunction with the technologies described herein.

FIG. 26 depicts an example cloud computing environment 2600 in which the described technologies can be implemented. The cloud computing environment 2600 comprises cloud computing services 2610. The cloud computing services 2610 can comprise various types of cloud computing resources, such as computer servers, data storage repositories, networking resources, etc. The cloud computing services 2610 can be centrally located (e.g., provided by a data center of a business or organization) or distributed (e.g., provided by various computing resources located at different locations, such as different data centers and/or located in different cities or countries).

The cloud computing services 2610 are utilized by various types of computing devices (e.g., client computing devices), such as computing devices 2620, 2622, and 2624. For example, the computing devices (e.g., 2620, 2622, and 2624) can be computers (e.g., desktop or laptop computers), mobile devices (e.g., tablet computers or smart phones), or other types of computing devices. For example, the computing devices (e.g., 2620, 2622, and 2624) can utilize the cloud computing services 2610 to perform computing operators (e.g., data processing, data storage, and the like).

Example 20—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 25, computer-readable storage media include memory 2520 and 2525, and storage 2540. The term computer-readable storage media does not include signals and carrier waves. In addition, the term computer-readable storage media does not include communication connections (e.g., 2570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    at least one hardware processor;
    at least one memory coupled to the at least one hardware processor; and
    one or more computer readable storage media storing computer-executable instructions that, when executed, cause the computing system to perform operations comprising:
        receiving a first set of one or more words in a first human language;
        assigning a first logical pointer value to the first set of one or more words in a first human language;
        storing the first logical pointer value in association with an element of a first data artifact in a definition of the first data artifact, wherein the definition of the first data artifact comprises a first plurality of data artifact elements;
        at a target of the first logical pointer value, providing at least a first translation of the first set of one or more words in a second human language, wherein the second human language is different than the first human language;
        receiving a second set of one or more words in the first human language;
        determining that the second set of one or more words in the first human language is equal to the first set of one or more words in the first human language; and
        assigning a third logical pointer value to the second set of one or more words in the first human language; the assigning the third logical pointer value to the second set of one or more words in the first human language comprising:
            (1) automatically assigning the first logical pointer value as the third logical pointer value without receiving user input specifying that the first logical pointer value is to be assigned as the third logical pointer value and storing the third logical pointer value in association with an element of a second data artifact in a definition of the second data artifact, wherein the second data artifact comprises a second plurality of data artifact elements; or
            (2) determining that the first set of one or more words in the first human language is associated with at least a second logical pointer value, wherein a target of the at least a second logical pointer value comprises at least a second translation of the first set of one or more words in the first human language in the second human language, wherein the second translation is different than the first translation;
            determining that the first logical pointer value or the at least a second logical pointer value is a selected logical pointer value to be assigned to the second set of one or more words in the first human language;
            assigning the selected logical pointer value as the third logical pointer value; and
            storing the third logical pointer value in association with the element of the second data artifact in the definition of the second data artifact.

2. The computing system of claim 1, the operations further comprising:
    presenting to a user on a user interface context information regarding (i) the first translation and the at least a second translation; or (ii) a first instance of the first set of one or more words in the first human language and a second instance of the first set of one or more words in the first human language; and
    receiving user input selecting to assign the first logical pointer value or the at least a second logical pointer value to the third set of one or more words in the first human language.

3. The computing system of claim 2, wherein the context information comprises a translation associated with a respective set of one or more words in the first human language, a semantic context associated with a respective set of one or more words in the first human language, a user associated with a respective set of one or more words in the first human language, or a computing application, context, or environment associated with a respective set of one or more words in the first human language.

4. The computing system of claim 1, the operations further comprising:
    updating the at least one translation or replacing the at least one translation with a different translation; and
    maintaining the first logical pointer value for the first set of one or more words in the first human language after the updating or replacing.

5. The computing system of claim 1, wherein the target is a first target, the operations further comprising:
    updating the at least one translation to provide an updated translation;

in response to the updating, creating a second target, the second target comprising the updated translation;
maintaining the first logical pointer value for the first set of one or more words in a first human language; and
for a third set of one or more words in the first human language, the third set of one or more words in a first human language being equal to the first set of one or more words in the first human language, assigning a second logical pointer value, different from the first pointer value, to the third set of one or more words in a first human language, the second logical pointer value pointing to the second target.

6. The computing system of claim 1, wherein the target is a first target, the operations further comprising:
receiving at least a second translation of the set of one or more words in the first human language in the second human language;
creating a second target, the second target comprising the at least a second translation;
assigning a fourth logical pointer value to the first set, or a set equal to the first set of one or more words in a first human language, the fourth logical pointer value being different than the first logical pointer value and pointing to the second target;
providing the at least a second translation in the second target; and
assigning the fourth logical pointer value to the first set of one or more words in a first human language.

7. The computing system of claim 1, the operations further comprising:
receiving a second translation of the first set of one or more words in the second human language, the second translation being different than the first translation;
associating a fourth logical pointer value with the second translation or the first translation, wherein the fourth logical pointer value is different than the first logical pointer value;
creating an association between the first translation and the second translation.

8. The computing system of claim 1, the operations further comprising:
receiving a second translation of the first set of one or more words in the second human language, the second translation being different than the first translation;
creating a third set of one or more words in the first human language, the third set of one or more words in a first human language being equal to the first set of one or more words in a first human language;
assigning a fourth logical pointer value to the third set of one or more words in the first human language.

9. The computing system of claim 1, wherein the operations comprise (1).

10. The computing system of claim 1, wherein the operations comprise (2).

11. The computing system of claim 1, the operations further comprising:
receiving an update to the first set of one or more words in the first human language, the update comprising a third set of words in the first human language;
assigning a fourth logical pointer value to the third set of one or more words in the first human language, the fourth logical pointer value being different than the first logical pointer value.

12. The computing system of claim 11, the operations further comprising:
linking the first set of one or more word in the first human language to the third set of one or more words in the first human language.

13. The computing system of claim 12, the operations further comprising:
storing an identifier of a first use of the first set of one or more words in the first human language in association with the first set of one or more words in the first human language.

14. The computing system of claim 13, the operations further comprising:
based on a determination that the third set of words in the first human language was created and linked to the first set of one or more words in the first human language, updating the first use of the first set of one or more words in the first human language to use the third set of one or more words in the first human language.

15. The computing system of claim 14, wherein the determination is made in response to opening or saving a file comprising the identifier.

16. The computing system of claim 14, the operations further comprising:
deleting the first set of one or more words in the first human language while maintaining an identifier of the linking of the first set of one or more words in the first human language with the third set of one or more words in the first human language.

17. The computing system of claim 13, the operations further comprising,
based on a determination that the third set of one or more words in the first human language was created and linked to the first set of one or more words in the first human language, providing a notification that the third set of one or more words in the first human language was created.

18. The computing system of claim 17, the operations further comprising:
storing a first timestamp associated with the providing the notification;
determining that the first use is assigned the third logical pointer value;
comparing the first timestamp with a second timestamp assigned to the first set of one or more words in the first human language;
determining that the first timestamp is later than the second timestamp; and
not providing a notification that the third set of one or more words in the first human language was created.

19. A method, implemented in a computing system comprising at least one hardware processor and at least one memory coupled to the at least one hardware processor, comprising:
receiving a first set of one or more words in a first human language;
assigning a first logical pointer value to the first set of one or more words in a first human language;
storing the first logical pointer value in association with an element of a first data artifact in a definition of the first data artifact, wherein the definition of the first data artifact comprises a first plurality of data artifact elements, at least one data artifact element of the first plurality of data artifact elements establishing a relationship with a second data artifact;
at a target of the first logical pointer value, providing at least a first translation of the first set of one or more words in a second human language, wherein the second human language is different than the first human language;

receiving a second set of one or more words in the first human language;

determining that the second set of one or more words in the first human language is equal to the first set of one or more words in the first human language; and assigning a third logical pointer value to the second set of one or more words in the first human language; the assigning the third logical pointer value to the second set of one or more words in the first human language comprising:

(1) automatically assigning the first logical pointer value as the third logical pointer value without receiving user input specifying that the first logical pointer value is to be assigned as the third logical pointer value and storing the third logical pointer value in association with an element of the second data artifact in a definition of the second data artifact, wherein the second data artifact comprises a second plurality of data artifact elements; or (2) determining that the first set of one or more words in the first human language is associated with at least a second logical pointer value, wherein a target of the at least a second logical pointer value comprises at least a second translation of the first set of one or more words in the first human language in the second human language, wherein the second translation is different than the first translation;

determining that the at least a second logical pointer value is to be assigned to the second set of one or more words in the first human language;

assigning the at least a second logical pointer value as the third logical pointer value; and storing the third logical pointer value in association with the element of the second data artifact in the definition of the second data artifact.

20. One or more computer-readable storage media comprising:

computer-executable instructions that, when executed by a computing system comprising at least one memory and at least one hardware processor coupled to the at least one memory, cause the computing system to receive a first set of one or more words in a first human language;

computer-executable instructions that, when executed by the computing system, cause the computing system to assign a first logical pointer value to the first set of one or more words in a first human language;

computer-executable instructions that, when executed by the computing system, cause the computing system to store the first logical pointer value in association with an element of a first data artifact in a definition of the first data artifact, the first data artifact being in a physical data model or a virtual data model associated with a database system, wherein the definition of the first data artifact comprises a first plurality of data artifact elements;

computer-executable instructions that, when executed by the computing system, cause the computing system to, at a target of the first logical pointer value, provide at least a first translation of the first set of one or more words in a second human language, wherein the second human language is different than the first human language;

computer-executable instructions that, when executed by the computing system, cause the computing system to receive a second set of one or more words in the first human language;

computer-executable instructions that, when executed by the computing system, cause the computing system to determine that the second set of one or more words in the first human language is equal to the first set of one or more words in the first human language; and computer-executable instructions that, when executed by the computing system, cause the computing system to assign a third logical pointer value to the second set of one or more words in the first human language; the assigning the third logical pointer value to the second set of one or more words in the first human language comprising:

(1) automatically assigning the first logical pointer value as the third logical pointer value without receiving user input specifying that the first logical pointer value is to be assigned as the third logical pointer value and storing the third logical pointer value in association with an element of a definition of a second data artifact in the physical data model or the virtual data model associated with the database system, wherein the second data artifact comprises a second plurality of data artifact elements; or (2) determining that the first set of one or more words in the first human language is associated with at least a second logical pointer value, wherein a target of the at least a second logical pointer value comprises at least a second translation of the first set of one or more words in the first human language in the second human language, wherein the second translation is different than the first translation;

computer-executable instructions that, when executed by the computing system, cause the computing system to determine that the at least a second logical pointer value is to be assigned to the second set of one or more words in the first human language;

computer-executable instructions that, when executed by the computing system, cause the computing system to assign the at least a second logical pointer value as the third logical pointer value; and computer-executable instructions that, when executed by the computing system, cause the computing system to store the third logical pointer value in association with the element of the second data artifact in the definition of the second data artifact.

* * * * *